US009697275B2

(12) United States Patent
Marbach et al.

(10) Patent No.: US 9,697,275 B2
(45) Date of Patent: Jul. 4, 2017

(54) SYSTEM AND METHOD FOR IDENTIFYING GROUPS OF ENTITIES

(75) Inventors: Peter Marbach, Toronto (CA); Yueli Zhang, Toronto (CA)

(73) Assignee: Peter Marbach, Toronto (CA)

( * ) Notice: Subject to any disclaimer, the term of this patent is extended or adjusted under 35 U.S.C. 154(b) by 381 days.

(21) Appl. No.: 14/342,178

(22) PCT Filed: Aug. 29, 2011

(86) PCT No.: PCT/CA2011/050523
§ 371 (c)(1),
(2), (4) Date: Feb. 28, 2014

(87) PCT Pub. No.: WO2013/029146
PCT Pub. Date: Mar. 7, 2013

(65) Prior Publication Data
US 2014/0207769 A1    Jul. 24, 2014

(51) Int. Cl.
*G06F 17/30*    (2006.01)
*G06Q 10/04*    (2012.01)

(52) U.S. Cl.
CPC ....... *G06F 17/30598* (2013.01); *G06Q 10/04* (2013.01)

(58) Field of Classification Search
CPC .......................... G06F 17/30598; G06Q 10/04
USPC ....................................................... 707/723
See application file for complete search history.

(56) References Cited

U.S. PATENT DOCUMENTS

| 6,112,202 A | 8/2000 | Kleinberg |
| 6,618,725 B1 | 9/2003 | Fukuda et al. |
| 2007/0124291 A1 | 5/2007 | Hassan et al. |
| 2010/0223276 A1 | 9/2010 | Al-Shameri et al. |
| 2010/0268719 A1 | 10/2010 | Cormode et al. |
| 2010/0306223 A1 | 12/2010 | Lee et al. |

FOREIGN PATENT DOCUMENTS

| SG | WO 2008/073055 | * | 6/2008 | ............ G06F 17/30 |
| WO | 2008073055 | | 6/2008 | |
| WO | WO2008/073055 | * | 6/2008 | ............ G06F 17/00 |
| WO | WO 2008/073055 | * | 6/2008 | ............ G06F 17/00 |
| WO | PCT/US2009/067630 | * | 12/2009 | ............ G06F 17/30 |
| WO | 2011099982 | | 8/2011 | |
| WO | WO2011/099982 | * | 8/2011 | ............ G06F 17/00 |
| WO | WO 2011/099982 | * | 8/2011 | ............ G06F 17/00 |
| WO | WO 2011099982 | * | 8/2011 | ............ G06F 17/21 |

OTHER PUBLICATIONS

Chan, Alan; International Search Report from corresponding PCT Application No. PCT/CA2011/050523; search May 14, 2012.
(Continued)

*Primary Examiner* — Hosain Alam
*Assistant Examiner* — Tracy McGhee
(74) *Attorney, Agent, or Firm* — Blake, Cassels & Graydon LLP; Wilfred P. So

(57) ABSTRACT

A computer implemented system and method is used to identify groups of entities based on bipartite directed graphs. Each group consists of two sets of entities, which have some association between each other. Two parameters, typicality and coverage, are taken into account in the computation for identifying the groups.

39 Claims, 10 Drawing Sheets

(56) References Cited

OTHER PUBLICATIONS

Al-Zaidy, Rabeah et al.; Towards Discovering Criminal Communities form Textual Data; Concordia Institute for Systems Engineering, Concordia University; SAC'11, Mar. 21-25, 2011, TahChung, Taiwan.

Imafuji, Noriko; Effects of Maximum Flow Algorithm on Identifying Web Community; Institute of Industrial Services, The University of Tokyo; WIDM'02; Nov. 8, 2002, McLean, Virginia, USA.

J.M. Jon M. Kleinberg; Authoritative Sources in a Hyperlinked Environment; Journal of the ACM 46(5):604-632 (Sep. 1999).

* cited by examiner

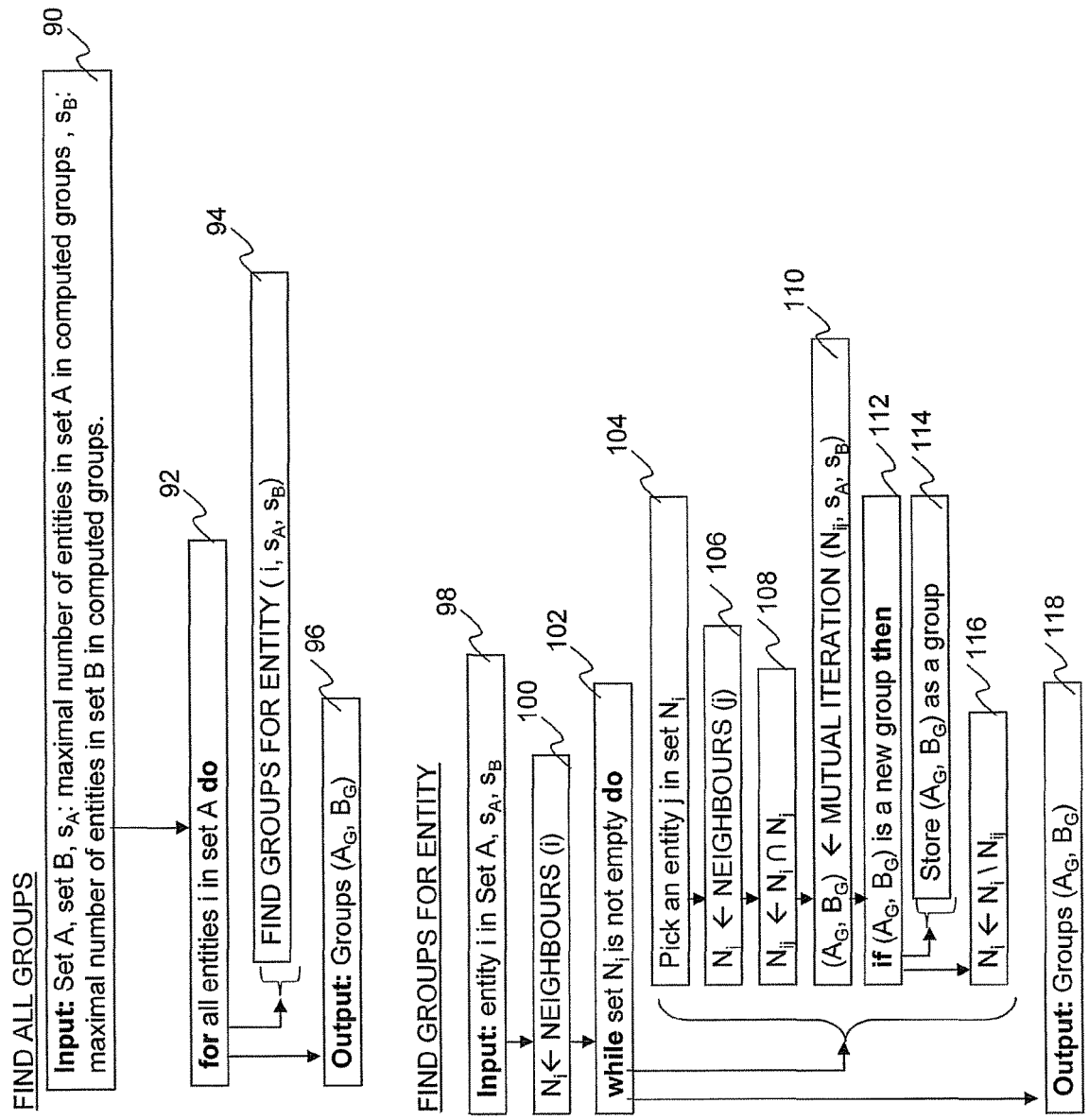

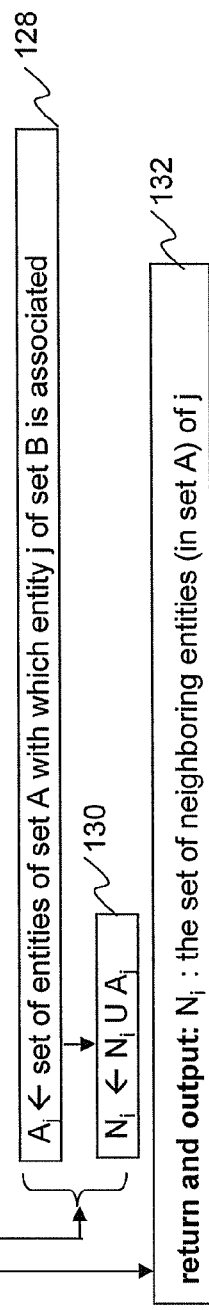
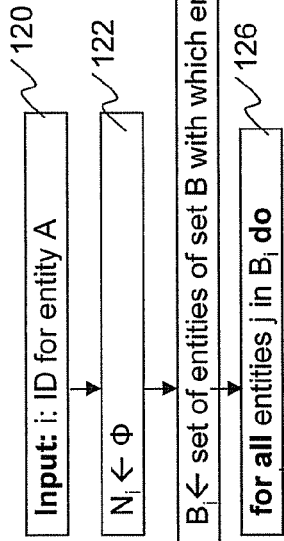
Figure 10
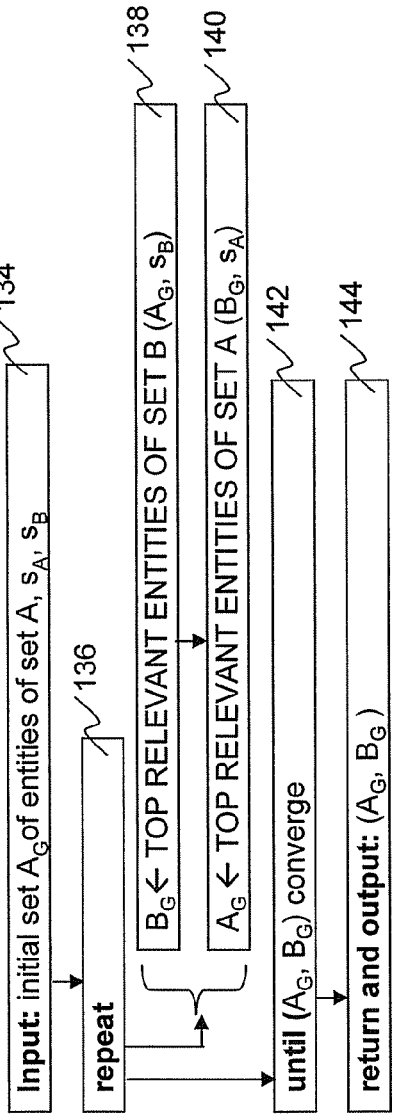
Figure 11

SYSTEM AND METHOD FOR IDENTIFYING GROUPS OF ENTITIES

TECHNICAL FIELD

The following relates to systems and methods for identifying a group of entities.

BACKGROUND

The field of data analysis and organization has become increasingly important as the volume and types of data increase. Data is used to track and represent things, people, events, actions, places, and more. Data is also collected in different circumstances.

In the Internet or the World Wide Web, for example, data is being passed between different users and websites. Users actions on the Internet are tracked, including which websites a user visits, which buttons a user clicks, what comments are posted by a user, and which keywords does a user input for searches. Interaction between websites, such as hyperlinks to one another, are also tracked. In the Internet environment, entities can be, for example, users, websites, servers, and hubs.

As another example, data can also be tracked in the healthcare field. The activities and identities of visitors, patients, and healthcare professionals within a hospital can be recorded as data. The interaction between illnesses, treatments, and the equipment used in the treatment may also be recorded as data. In the healthcare field, entities can be, for example, visitors, patients, healthcare professionals, hospitals, illnesses, treatments, and equipment.

In another example, data is tracked within the supply chain of goods and services. Buyers purchase goods or services from sellers. The goods or services may be provided by a manufacturer or another service entity. There can also be intermediary merchants. There are also shipments to deliver the goods and services. In such an environment, entities can be, for example, buyers, sellers, intermediary merchants, goods, services, manufacturers, service providers, and shipments.

It can be appreciated that in different circumstances, the identities of the entities and the types of data collected about the entities vary.

The collected data can be used to identify interactions between the entities. However, doing so is difficult when the amount of data is large.

BRIEF DESCRIPTION OF THE DRAWINGS

Embodiments will now be described by way of example only with reference to the appended drawings wherein:

FIG. 8 is a flow diagram illustrating example computer executable instructions for identifying a group of entities.

FIG. 9 is a flow diagram illustrating example computer executable instructions for identifying a group for a given entity, according to a function called in FIG. 8.

FIG. 10 is a flow diagram illustrating example computer executable instructions for identifying neighbouring entities of a given entity, according to a function called in FIG. 9.

FIG. 11 is a flow diagram illustrating example computer executable instructions for identifying a group, based on converging groups, according to a function called in FIG. 9.

DETAILED DESCRIPTION OF THE DRAWINGS

Entities interact with each other in various environments. As the number of entities grow and the number of interactions between entities increase, it can become difficult to identify patterns of interaction between entities.

It is desirable to group the entities based on similarities or interactions, or both. Groupings of entities are sometimes referred to as communities. Non-limiting examples of groupings or communities include online communities of users and communities of websites.

It has been recognized that methods for identifying communities, as known without the benefit of this present application, can be slow and inefficient when processing large amounts of data. These methods also tend to represent entities using "flat" graphs, in which the entities (represented as nodes on the graph) are considered part of one set.

The systems and methods described are used to efficiently process large amounts of data to identify groups of entities for bipartite directed graphs where entities are given by two sets, a Set U of entities and a Set W of entities, and there exists directed links from entities in a Set U to entities in a Set W. Bipartite directed graphs model the situation where entities in one set (i.e. Set U) access, or interact, with the entities in another set (i.e. Set W). An example of this situation is a Set U of users that access a Set W of websites. Another example is a Set U of buyers that buy products from a Set W. Other physical or conceptual representation that can be expressed as two disjoint sets in a bipartite directed graph are applicable to the principles described herein.

The systems and methods as provided with the benefit of the present application determine whether or not a group of entities can be identified. In particular, by representing the entities as two sets in a bipartite graph, computational efficiencies are achieved when identifying the groups.

Figure 1:
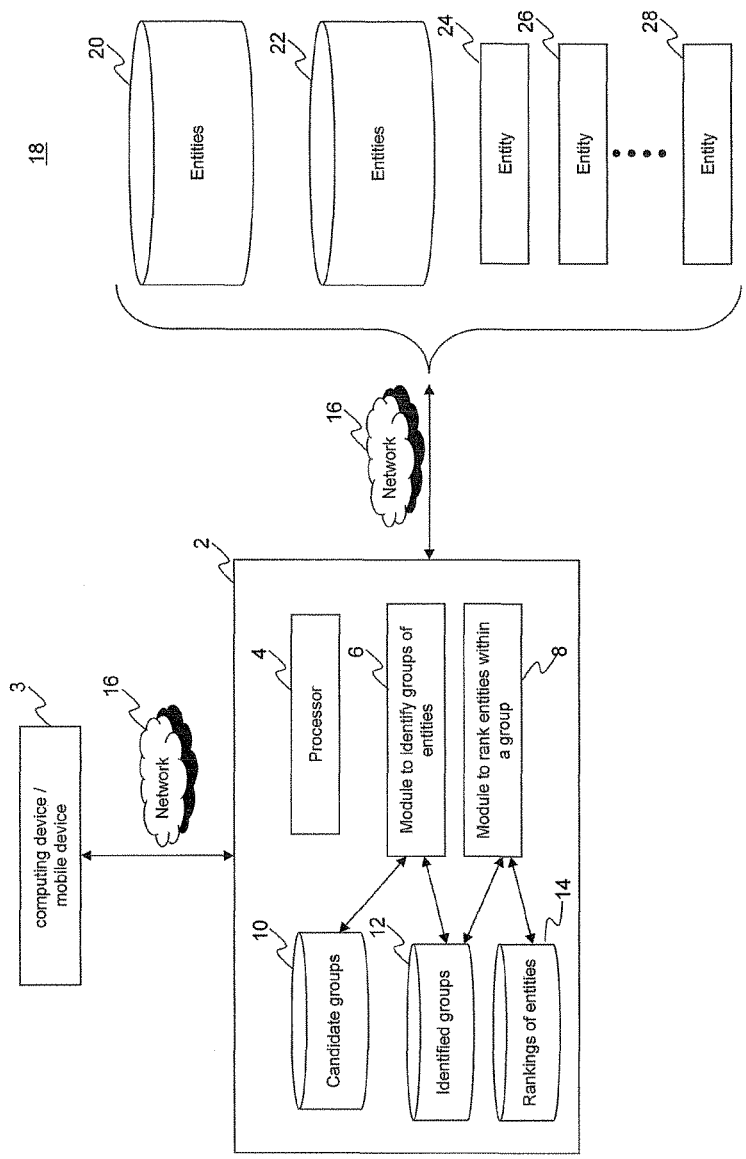
FIG. 1 is a schematic diagram illustrating an example embodiment of a system in which a computing device and its components have access to data about multiple entities.

Turning to FIG. 1, a computing device 2 is shown having access to data related to entities 18. The data related to the entities 18 can be accessed over a data network 16 (e.g.

wired or wireless network), or may be stored on the computing device 2. The data may comprise one or more databases 20, 22 which stores information related to the entities and their interactions. The data may also be provided from the entities 24, 26, 28. For example, the interactions between the entities 24, 26, 28 are monitored by the computing device 2.

The computing device 2 includes a processor 4 for executing computer executable instructions. It also includes a module or software application 6 for identifying groups of entities. The computing device 2 also includes a module or software application 8 to rank entities within a group. The computing device 2 may also have stored thereon candidate groups 10. These groups 10 may or may not be actual groups. The identified groups are also stored in memory 12. The computing device 2 also has stored thereon ranking of entities within a group 14.

Another computing device 3 may be in communication with the computing device 2, for example, over a network 16. The computing device 3 can be a mobile device, a desktop computer, a laptop, a tablet computer, a smart phone, etc. The computing device 3 can be used to send parameters to the computing device 2, whereby the computing device 2 uses the parameters to identify groups. The computing device 2 can then return a result to the other computing device 3. The result may include a ranking of entities within a group, an indication that multiple groups have been identified, or an indication that no groups have been identified based on the provided parameters. For example, if the parameter is a keyword, the systems and methods described herein can use the keyword to identify a group of websites or users, or both, that discuss the keyword.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the computing device 2, the other computing device 3, the entities 18, etc., or accessible or connectable thereto. Any application or module herein described may be implemented using computer readable/executable instructions that may be stored or otherwise held by such computer readable media.

Figure 2:
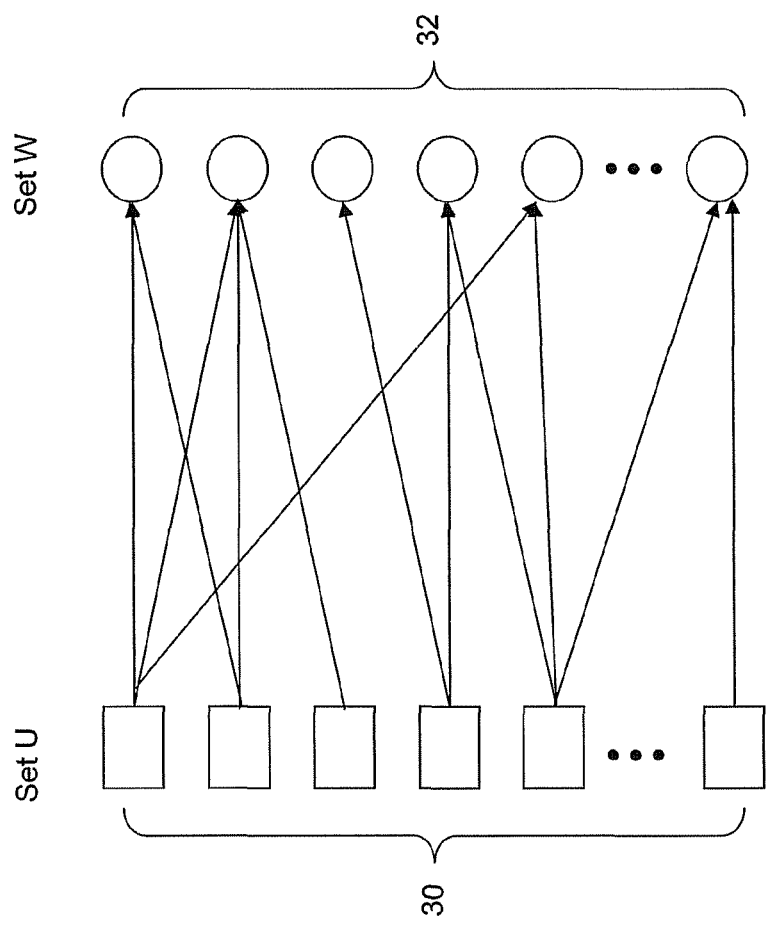
FIG. 2 is a schematic diagram illustrating an example bipartite directed graph where entities in Set U have a directed link to entities in Set W.

Turning to FIG. 2, the entities to be grouped are able to be represented in a bipartite directed graph. A set of entities 30 is marked as belonging to Set U, while another set of entities 32 is marked as belonging to Set W. The entities of Set U are illustrated with rectangular nodes. The entities of Set W are illustrated with circular nodes. The associations between the nodes of Set U and Set W are represented by the directed edges.

By way of background, in the mathematical field of graph theory, a bipartite directed graph is a graph whose vertices can be divided into two disjoint sets U and W such that every directed edge connects a vertex in set U to one in set W; that is, U and W are independent sets. Equivalently, a bipartite directed graph is a directed graph that does not contain any directed odd-length cycles.

Figure 3:
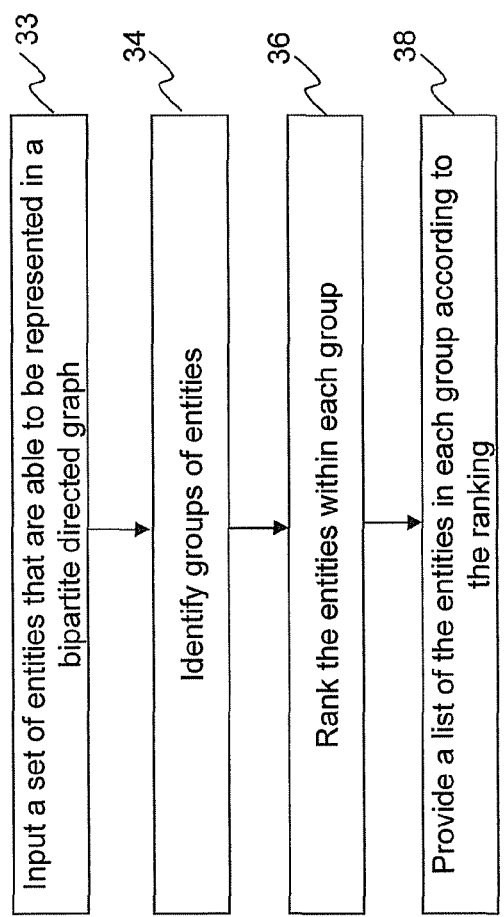
FIG. 3 is a flow diagram illustrating example computer executable instructions which takes as an input a set of entities that can be represented by a bipartite directed graph and identifies groups of entities and ranks the entities within each group.

Turning to FIG. 3, using as input a set of entities that can be represented by a bipartite directed graph (block 33) the example computer executable instructions for identifying groups of entities and ranking entities include: identifying a group of entities (block 34); ranking entities within the group (block 36); and providing a list of entities in the group according to the ranking (block 38). The entities are able to be represented in a bipartite directed graph. Details regarding these operations are discussed below.

Figure 4:
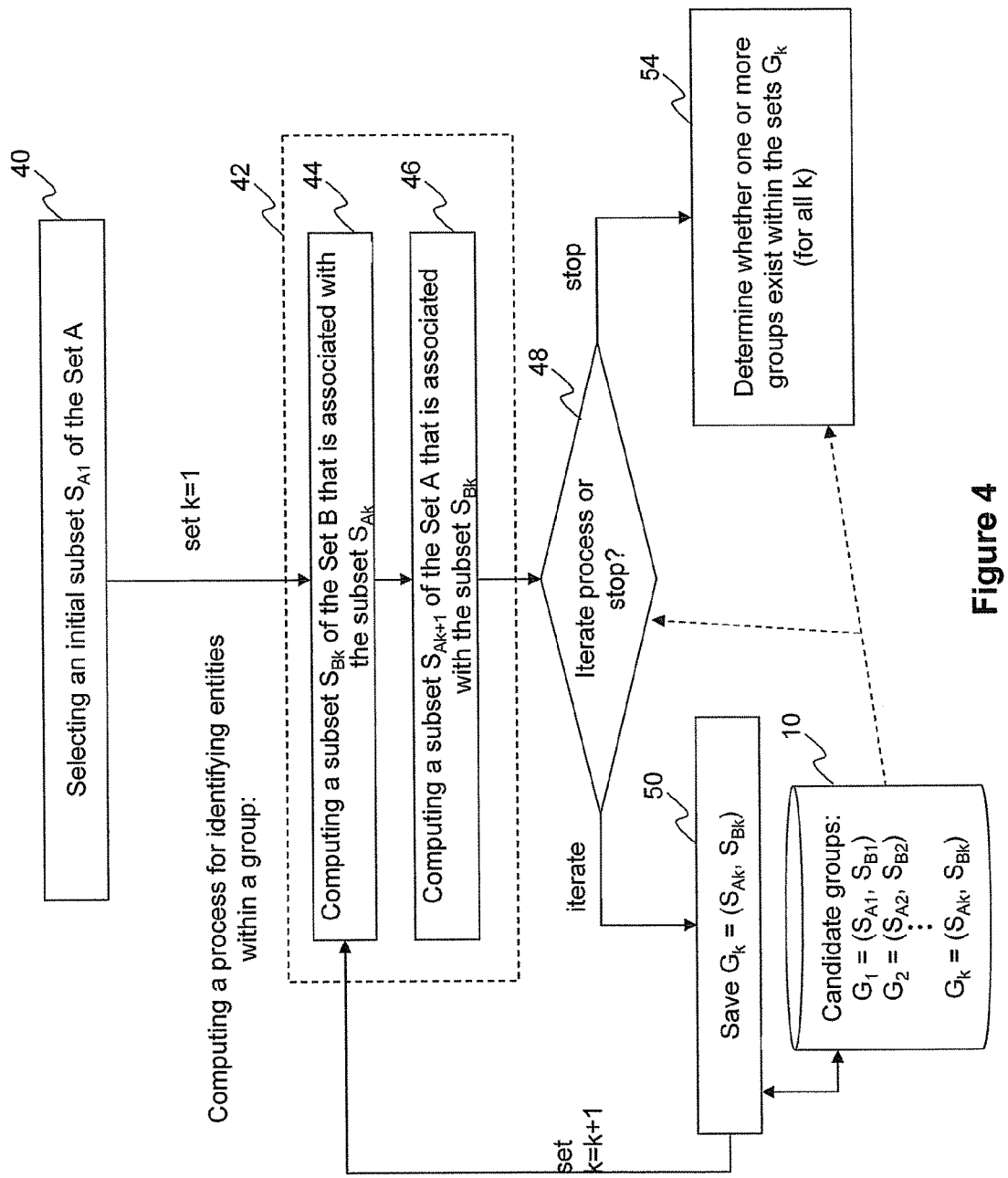
FIG. 4 is a flow diagram illustrating example computer executable instructions for determining whether one or more groups can be determined using as an input a subset either of Set U or Set W.

FIG. 4 provides example computer executable instructions for determining groups of entities. The notations Set A and Set B are used hereon, but these can respectively represent either Set U and Set W, or respectively represent Set W and Set U. In other words, at block 40, the input is an initial subset of either Set U or Set W. If the input is a subset of Set U in the bipartite directed graph, then Set A is set equal to U; if the input is a subset of Set W, then Set A is set equal to Set W. This means that the process can either be started from a subset of Set U, or from a subset of Set W, in the bipartite directed graph.

At block 40, the computing device 2 obtains or selects an initial subset $S_{A1}$ of Set A, whereby a subset of Set A is generically denoted by $S_{Ak}$. As it is the initial subset, the counter value k is set to 1. It is appreciated that the counter k can increase with each iteration. Therefore, the initial subset can be represented as $S_{A1}$. At block 42, additional subsets are identified which may be used to form a group. As will be discussed below, the operations of block 42 can be iterated multiple times, and can stop or continue based on different conditions.

In particular, block 42 includes computing a subset of Set B based on a given subset of Set A (block 44). Then, also within block 42, another subset of Set A is computed based on the recently computed subset of Set B (block 46).

In particular at block 44, a subset $S_{Bk}$ of the set B is computed, whereby subset $S_{Bk}$ is associated with the subset $S_{Ak}$. At block 46, a subset $S_{Ak+1}$ of the set A is computed, whereby subset $S_{Ak+1}$ is associated with the subset $S_{Bk}$. For example, in an initial computation, at block 44, $S_{B1}$ is computed such that it is associated with $S_{A1}$, and at block 46, $S_{A2}$ is computed such that it is associated with $S_{B1}$.

At block 48, the computing device 2 then determines whether to compute an iteration of block 42 or to stop the process. One or more factors may be considered when determining whether to iterate or stop the process. Examples of such factors are discussed below.

Continuing with FIG. 4, if it is determined that the process should be iterated, then at block 50, a group represented by $G_k$ is stored into memory in the candidate groups database 10. The group $G_k$ comprises the recently computed subsets $S_{Ak}$ and $S_{Bk}$, and can be represented with the notation $G_k=(S_{Ak}, S_{Bk})$. For example, in the initial computation, where the counter value k=1, the group $G_1=(S_{A1}, S_{B1})$ is saved into the database 10.

Upon saving the candidate group, the counter value k is increased by one, and is represented by the notation k=k+1. That is k=2. The process repeats with block 42, in which the operations of blocks 44 and 46 are executed. In other words, in a first iteration, a subset $S_{B2}$ of the set B is computed, whereby $S_{B2}$ is associated with the subset $S_{A2}$ (block 44). Then a subset $S_{A3}$ is computed of the set A, whereby $S_{A3}$ is associated with $S_{B2}$. It is then determined whether to iterate the process of stop (block 48). If the process is iterated, the candidate group $G_2=(S_{A2}, S_{B2})$ is saved in the database 10 (block 50), and the counter value k is again increased by one. That is k=3. The process of block 42 again repeats.

If, at block 48, it is determined that the process is to be stopped, then at block 54, it is determined whether one or more groups exist within the subsets or entities stored in the candidate groups database 10.

As shown by the dotted lines, the candidate groups stored in database 10 can be accessed when executing operations at block 48 and 54.

Figure 5:
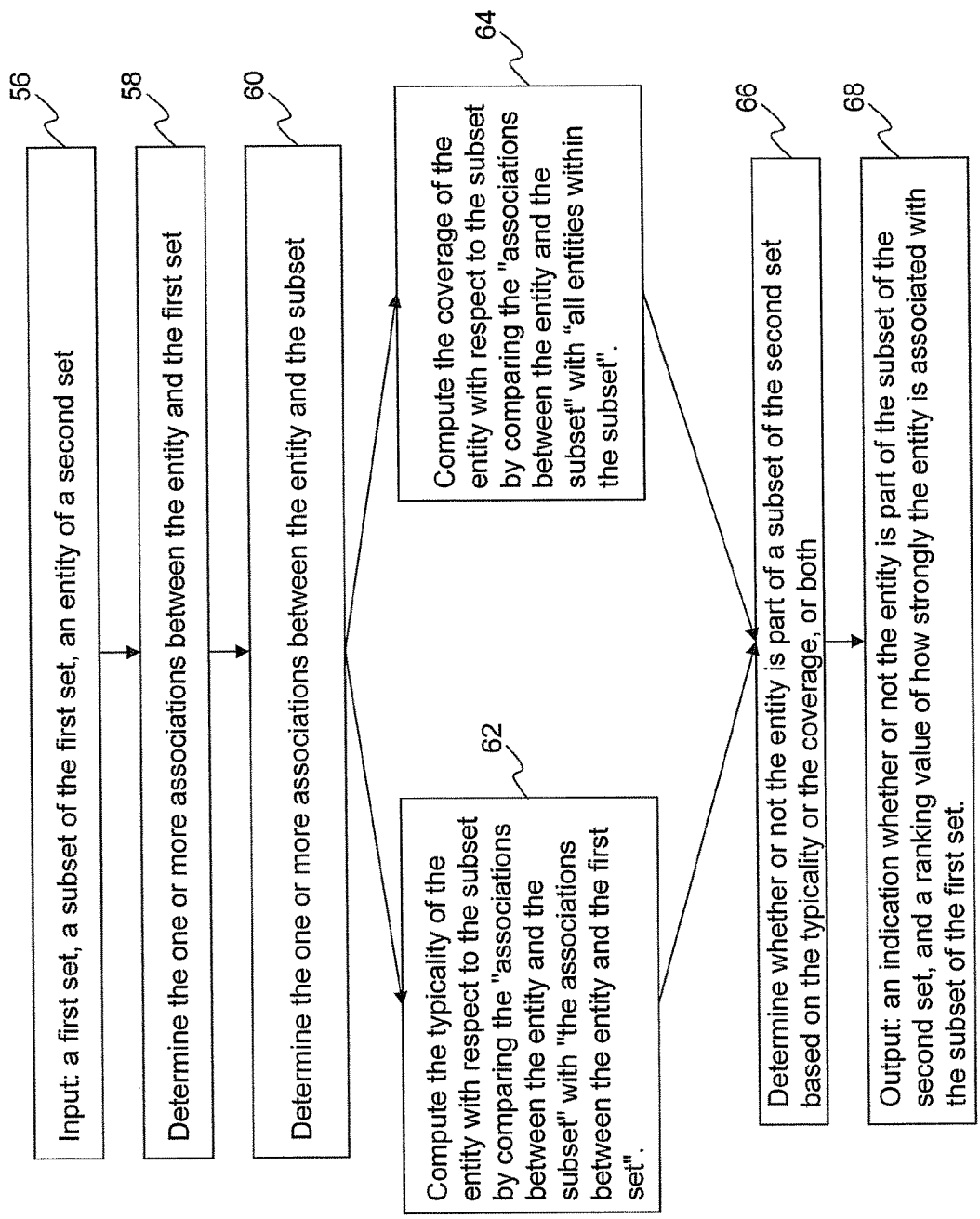
FIG. 5 is a flow diagram illustrating example computer executable instructions for determining whether an entity is part of a second subset, the second subset associated with a first subset.

Turning to FIG. 5, example computer executable instructions are provided for determining whether or not an entity is part of a subset. These instructions can be executed at block 44 or block 46, or both. At block 56 of FIG. 5, the inputs include a first set, a subset of the first set, and an entity of a second set. In one example, the first set can be Set A, and a subset of Set A is some $S_{Ak}$, for a counter value of k. The second set can be Set B, where an entity within Set B is represented by the notation $E_B$. Such an example scenario would apply to block 44, when determining whether or not an entity within Set B is part of the subset $S_{BK}$ which is associated the subset $S_{Ak}$. It will be appreciated that the operations of FIG. 5 can be applied simultaneously or in parallel to many different entities within Set B to compute the subset $S_{Bk}$.

In another example, the inputs include a first set being Set B, a subset of the set B being $S_{Bk}$, and an entity $E_A$ of a second set being Set A. In such an example, the operations of FIG. 5 would apply to block 46 to determine whether or not an entity within the Set A is part of the subset $S_{Ak+1}$, whereby the subset $S_{Ak+1}$ is associated with the subset $S_{Bk}$. The operation of FIG. 5 can be applied simultaneously or in parallel to many different entities within Set A to compute the subset $S_{Ak+1}$.

By applying the process of FIG. 5 to many different entities simultaneously or in parallel, the process for identifying a group of entities in a large set or sets, becomes faster.

For simplicity, since the operations of FIG. 5 can be used in both blocks 44 and 46, the inputs have therefore been generalized as a first set, a subset of the first set, and an entity of a second set.

At block 58, the computing device 2 obtains or determines all associations between the entity (of the second set) and the first set. This can be obtained or determined from the data 18. The computing device 2 then obtains or determines all associations between the entity (of the second set) and the subset (of the first set) (block 60). It will be appreciated that the entity (of the second set) may or may not be associated with every entity in the subset (of the first set) or with every entity in the first set. The typicality value and the coverage value are then computed for the given entity (of the second set).

At block 62, the typicality of the entity with respect to the subset is computed by comparing the "associations between the entity and the subset" with "the associations between the entity and the first set.

At block 64, the coverage of the of the entity with respect to the subset is computed by comparing the "associations between the entity with the subset" with "all entities within the subset".

In another example embodiment, one or more associations between the subset of the first set and the second set are obtained. When computing the coverage value at block 64, a comparison is made between the "associations between the entity and the subset of the first set" and the "associations between the subset of the first set and second set".

Based on the typicality value or the coverage value, or both, of the given entity (of the second set), it is then determined whether or not the entity is part of a subset of the second set (block 66). For example, if the typicality value or the coverage value, or both, are above a certain threshold, then the entity is considered to be part of a subset of the second set. In other words, this is how the entities of the subset $S_{Bk}$ are identified (block 44) or the entities of the subset $S_{Ak+1}$ are identified (block 46). In another example, if the product or sum of the typicality and coverage values is above a certain threshold, then the entity is part of the subset of the second set. More generally, if a ranking function, which uses the typicality value or coverage value, or both, as inputs, returns an output above a threshold, then the entity is part of the subset of the second set.

At block 68, the computing device 2 outputs an indication as to whether or not the entity is part of the subset of the second set, and as well as ranking value of how strongly the entity is associated with the subset of the first set.

As described above, the operations of FIG. 5 can executed independently for each entity within a set, and thus, these operations can be executed in parallel. This provides significant time savings when computing large data sets having numerous entities. In other words, the computing device 2 can quickly compute or identify a subset of a second set that is associated with a given subset of a first set.

Figure 6:
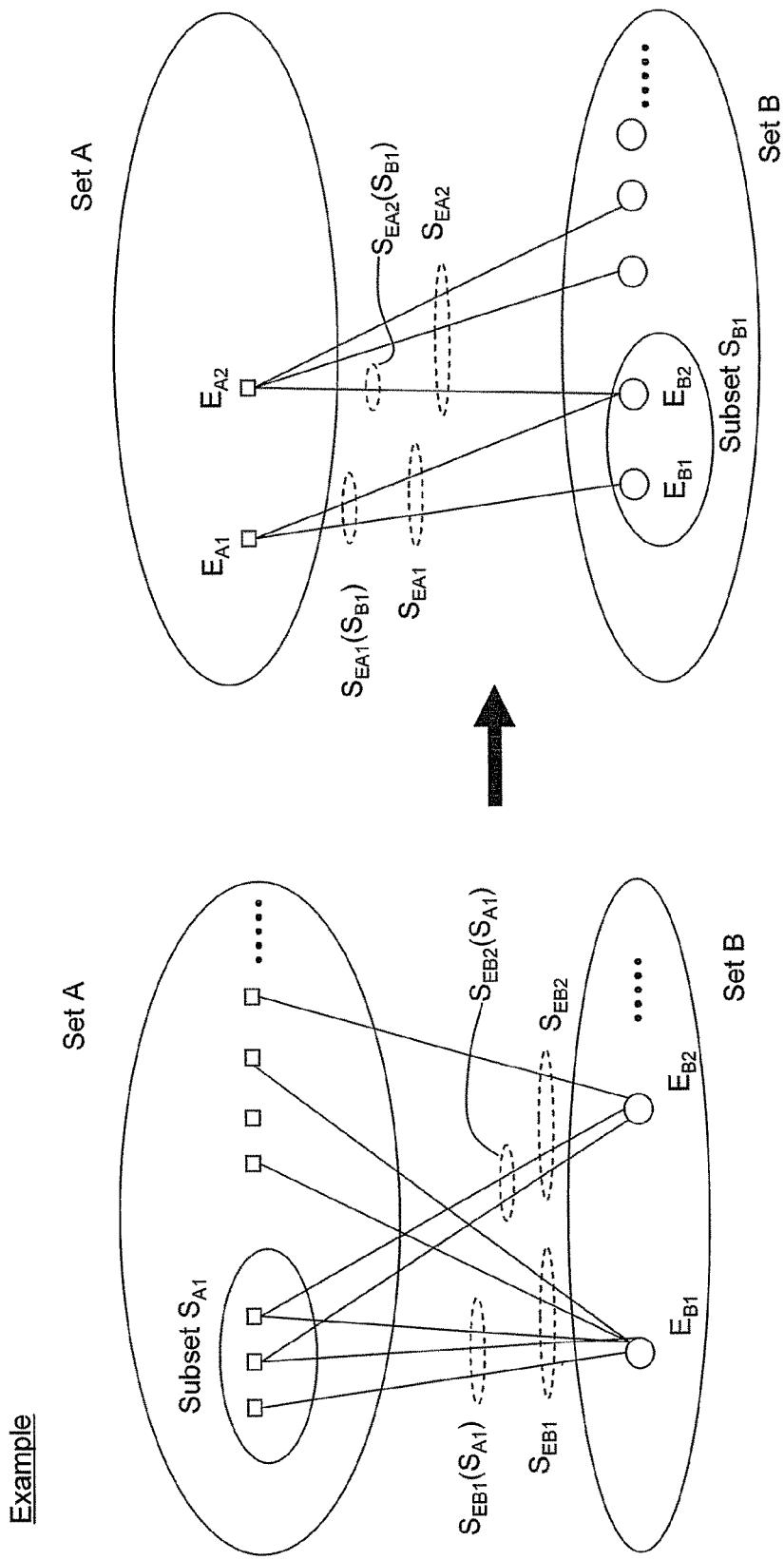
FIGS. 6A and 6B are schematic diagrams of example operations for identifying a second subset associated with a first subset, and identifying a third subset associated with the second subset.

An example process of blocks 44 and 46, as well as the process of FIG. 5 is schematically illustrated in FIGS. 6A and 6B. In particular, FIG. 6A illustrates block 44, and FIG. 6B illustrates block 46.

Turning to FIG. 6A, two sets of entities are shown as Set A and Set B. The entities of Set A are illustrated with squares and the entities of Set B are illustrated with circles. Two entities of Set B are shown and labelled as EB1 and EB2. Using the process of FIG. 5, it is determined that the entity $E_{B1}$ is associated with some entities within the Set A, a portion of which are within the subset $S_{A1}$. The associations between the entity $E_{B1}$ and the entities of Set A are denoted as $S_{EB1}$. The associations between the entity $E_{B1}$ and the entities within the subset $S_{A1}$ are denoted as $S_{EB1}(S_{A1})$. The typicality value of $E_{B1}$ includes a comparison of the associations $S_{EB1}(S_{A1})$ to the associations $S_{EB1}$. The coverage value of $E_{B1}$ includes a comparison of the associations $S_{EB1}(S_{A1})$ to all other entities within subset $S_{A1}$.

Similarly, for example, in parallel to entity $E_{B1}$, the entity $E_{B2}$ is also being analyzed to determine whether or not it is to be added to the subset $S_{Bk}$. The associations, denoted $S_{EB2}$, between the entity $E_{B2}$ and entities within Set A are obtained or determined. The associations, denoted $S_{EB2}(S_{A1})$, between the entity $E_{B2}$ and the entities within the subset $S_{A1}$ are also obtained or determined. The typicality value of $E_{B2}$ includes a comparison of the associations $S_{EB2}(S_{A1})$ to the associations $S_{EB2}$. The coverage value of $E_{B2}$ includes a comparison of the associations $S_{EB2}(S_{A1})$ to all other entities within subset $S_{A1}$.

In this example, the entities $E_{B1}$ and $E_{B2}$ have typicality and coverage values above certain thresholds and thus, they are determined to be part of the subset $S_{B1}$.

Turning to FIG. 6B, the subset $S_{A2}$ is then computed based on associations with the subset $S_{B1}$. For example, the entities $E_{A1}$ and $E_{A2}$ are individually or separately considered, and which can be done in parallel. The entity $E_{A1}$ is associated with entities in Set B, and these associations are denoted by $S_{EA1}$. The associations between $E_{A1}$ and the entities in the subset $S_{B1}$ are denoted by $S_{EA1}(S_{B1})$. Similarly, the notations $S_{EA2}$ and $S_{EA2}(S_{B1})$ are used to denote the associations between the entity $E_{A2}$ and the entities in Set B, and between the entity $E_{A2}$ and the entities in subset $S_{B1}$, respectively.

The typicality value of $E_{A1}$ includes a comparison of the associations $S_{EA1}(S_{B1})$ to the associations $S_{EA1}$. The coverage value of $E_{A1}$ includes a comparison of the associations $S_{EA1}(S_{B1})$ to all other entities within subset $S_{B1}$.

The typicality value of $E_{A2}$ includes a comparison of the associations $S_{EA2}(S_{B1})$ to the associations $S_{EA2}$. The coverage value of $E_{A2}$ includes a comparison of the associations $S_{EA2}(S_{B1})$ to all other entities within subset $S_{B1}$.

Figure 7:
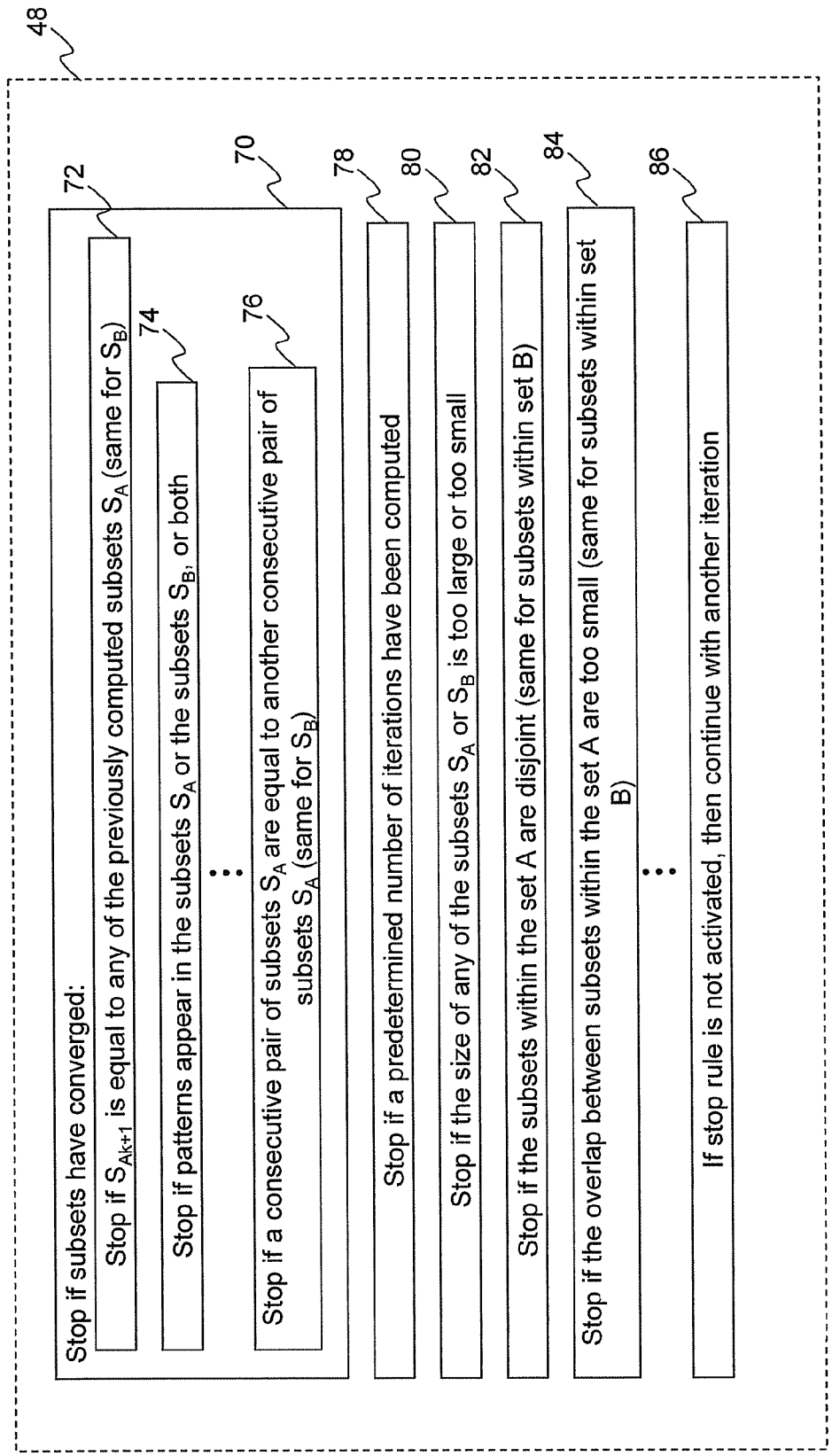
FIG. 7 is a flow diagram illustrating example computer executable instructions for determining whether to compute another iteration or stop according to an operation in FIG. 4.

Turning to FIG. 7, an example set of conditions or rules are provided for determining whether to compute another iteration or stop, as per block 48 described in FIG. 4.

In FIG. 7, the process of FIG. 4 stops if the subsets have converged (block 70). This can be determined by tracking the subsets stored within the candidate groups database 10.

For example, the process is stopped if the subset $S_{Ak+1}$ is equal to any of the previously computed subsets $S_A$ (block 72). This applies to subsets of the Set B as well. In another example, the subsets have converged if patterns appear in the subsets $S_A$ or the subsets $S_B$, or both (block 74). In another example, the subsets have converged if a consecutive pair of subsets $S_A$ are equal to another consecutive pair of subsets $S_A$ (block 76). this also applies for subsets of Set B. It is appreciated that there may be other factors for determining whether the subsets have converged, and these are also applicable to the principles described herein.

The process can also stop if a predetermined number of iterations have been computed (block 78). For example, if the counter value k has reached a predetermined number, then the process in FIG. 4 stops.

Another rule or condition is that the process stops if the size of any of the subsets $S_A$ or $S_B$ is too small or too large (block 80). For example, if a computed subset is null or has no entities, then the process stops. In another example, if the subset has too many entities, then the process stops.

The process can also stop, for example, if the subsets within the Set A are disjoint (block 82). For example, subset $S_{A1}$, subset $S_{A2}$, etc. are disjoint if they do not have any common entities amongst each other. The process is stopped since disjoint subsets do not provide an indication that they will converge, and thus, a group may possibly not be found. This stopping rule or condition also applies to subsets within the Set B.

The process can also stop, for example, if the overlap between subsets within the set A is too small (block 84). For example, although the subsets of the same set are not disjoint, the number of common entities between the subsets is considered too small. Therefore, this can be considered an indication that the subsets may not converge, and that a group might not be found. This stopping rule also applies to Set B.

If a stopping rule is not activated, then the process of FIG. 4 is iterated (block 86).

It can be appreciated that there may be other rules or conditions for stopping or continuing to iterate the process of FIG. 4.

There may be various ways to determine whether one or more groups exist within the candidate groups stored in the database 10. In general, if it is found that the subsets have converged, then those entities or subsets that have converged are considered to be part of a group. It is appreciated that more than one group can be found. For example, the subsets may converge onto multiple subsets and these multiple subsets are used to respectively form the multiple groups of entities.

Various approaches can be used in the ranking process. In general, the entities within a group are ranked according to their typicality value or their coverage value, or both. In an example embodiment, a higher ranking is computed for an entity if the entity has higher typicality values or coverage values, or both.

FIGS. 8, 9, 10, 11, 12 and 13 show an example embodiment of the process for finding a group of entities given two sets, Set A and Set B. The coverage and typicality computations depend on whether Set A corresponds to Set U or Set W, in the bipartite directed graph. Examples for the coverage and typicality computations for a given entity in Set U and Set W are provided below.

It can be appreciated that the notation of Set U and Set W can be used, for example, when computing the typicality and the coverage values, since the equations will be different when dealing with entities in a bipartite directed graph. The direction of the links between the entities is considered when using Set U and Set W.

One way to compute the coverage and typicality is by means of a preference, or association, vector that is assigned to each entity in Set U in the bipartite directed graph. The notation $P_i(j)$ refers to the preference vector of an entity i in Set U which is associated with an entity j in Set W. The preference $P_i(j)$ can for example be given by the probability that the given entity i in set U interacts with, or is associated with, the given entity j in set W.

The preferences vectors for entities in Set U can be used to compute association vectors for entities in Set W. The notation $Q_j(i)$ indicates how strongly entity j in Set W is associated with entity i in Set U. An example function for computing $Q_j(i)$ is $$Q_j(i) = P_i(j)$$

or $$Q_j(i) = \frac{P_i(j)}{\sum_{h \in U} P_h(j)}.$$

Let i represent the identity of an entity within the Set U in the bipartite directed graph. Let $W_G$ represent a subset of entities of Set W. The typicality $\delta(i, W_G)$ of an entity i (of Set U) over a subset $W_G$ is:

$$\delta(i, W_G) = \frac{\sum_{j \in W_G} P_i(j)}{\sum_{j \in SetW} P_i(j)}$$

Let j represent an entity in Set W and let $U_G$ represent a subset of entities of Set U. The typicality $\delta(j, U_G)$ an entity j (of Set W) with respect to subset $U_G$ is:

$$\delta(j, U_G) = \frac{\sum_{i \in U_G} Q_j(i)}{\sum_{i \in U} Q_j(i)}$$

The coverage $\rho(i,W_G)$ of an entity i (of Set U) with respect to a subset $W_G$ is:

$$\rho(i, W_G) = \frac{\sum_{j \in W_G} P_i(j)}{\sum_{j \in W_G} \frac{\sum_{h \in U} P_{h(j)}}{|U|}}$$

The coverage of an entity j in Set W is similarly defined. It can be appreciated that the notation of the bars (e.g. |U|) represents the number of elements in the set. Thus, |U| refers to the number of elements in Set U.

The coverage $\rho(j,U_G)$ of an entity j (of Set W) with respect to a subset $U_G$ of Set U is:

$$\rho(j, U_G) = \frac{\sum_{i \in U_G} Q_j(i)}{\sum_{i \in U_G} \frac{\sum_{k \in W} Q_{j(k)}}{|W|}}$$

In some applications, it is possible to associate a weight $w(i,U_G)$ with an entity i with respect to the subset $U_G$ of Set U. The weight can for example characterize how "important" entity i is with respect to all other entities in the subset $U_G$.

Similarly, a weight $w(j,W_G)$ of an entity j in Set W with respect to the subset $W_G$ of Set W can be defined.

In this case, a more refined computations of the coverage and typicality can be carried out as defined below.

The typicality $\delta(i,W_G)$ of an entity i (of Set U) over a subset $W_G$ is:

$$\delta(i, W_G) = \frac{\sum_{j \in W_G} P_i(j)w(j, W_G)}{\sum_{j \in SetW} P_i(j)w(j, W)}$$

Let $U_G$ represent a subset of entities of Set U.

The typicality $\delta(j,U_G)$ of an entity j (of Set W) over a subset $U_G$ is:

$$\delta(j, U_G) = \frac{\sum_{i \in U_G} Q_j(i)w(i, U_G)}{\sum_{i \in U} Q_j(i)w(i, U)}$$

The coverage $\rho(i,W_G)$ of an entity i (of Set U) over a subset $W_G$ is:

$$\rho(i, W_G) = \frac{\sum_{j \in W_G} P_i(j)w(j, W_G)}{\sum_{j \in W_G} w(j, W_G) \frac{\sum_{h \in U} P_{h(j)}}{|U|}}$$

The coverage of an entity j in Set W is similarly defined as $$\rho(j, U_G) = \frac{\sum_{i \in U_G} Q_j(i)w(i, U_G)}{\sum_{i \in U_G} w(i, U_G) \frac{\sum_{k \in W} Q_{j(k)}}{|U|}}$$

The above definitions of typicality and coverage are based on the knowledge of the preference vector. However, in some applications the true preference vectors of the entities are not known or available. In some cases, it can be observed, using the data, the set of entities (e.g. of Set U) with which a given entity (e.g. of Set W) is associated, and vice versa. Therefore, alternative definitions of typicality and coverage, which are based on the observed data, can be used. These definitions have similar physical meanings as the previous definitions, and can be also used with the algorithms described herein. Moreover, these definitions can be applied to general bipartite graphs, not only bipartite directed graphs. The alternative definitions are provided below which covers the case where Set A is Set U in the bipartite directed graph and Set B is Set W, as well as the case where Set A is Set W in the bipartite directed graph and Set B is Set U. In other words, the below example relationships apply to entities represented in a bipartite graph, which may not necessarily be a bipartite directed graph.

Let $B_i$ represent a set of entities within Set B with which an entity i (of Set A) is associated.

Let $A_j$ represent a set of entities within Set A with which an entity j (of Set B) is associated.

The typicality $\delta(i,B_G)$ of an entity i (of Set A) over a subset $B_G$ is:

$$\delta(i, B_G) = \frac{|B_i \cap B_G|}{|B_i|}$$

The typicality $\delta(j,A_G)$ of an entity j (of Set B) over a subset $A_G$ is:

$$\delta(j, A_G) = \frac{|A_j \cap A_G|}{|A_j|}$$

The coverage $\rho(j,A_G)$ of an entity j (of Set B) over a subset $A_G$ is:

$$\rho(j, A_G) = \frac{|A_j \cap A_G|}{|A_G|}$$

The coverage $\rho(i,B_G)$ of an entity i (of Set A) over a subset $B_G$ is:

$$\rho(i, B_G) = \frac{|B_i \cap B_G|}{|B_G|}$$

The double bars represent the number of entities in a set or subset. For example, $|B_G|$ represents the number of elements in the subset $B_G$.

It can be appreciated that the definition of a group can be based on the values of typicality and coverage.

In an example embodiment, the criterion of determining a group can be represented by predetermined thresholds on the typicality value and coverage values of the entities in Set A or Set B, or both. Below is another example embodiment of a definition of a group, which is more general.

A $(\delta_U, \delta_W, \rho_U, \rho_W)$-group consists a subset $U_G$ of entities in Set U and a subset $W_G$ of entities in Set W such that:

$$\delta(i, W_G) \geq \delta_U, \; \rho(i, W_G) \geq \rho_U, \; \forall i \in U_G$$

and $$\delta(j, U_G) \geq \delta_W, \; \rho(j, U_G) \geq \rho_W, \; \forall j \in W_G$$

In the above definition, the size of a group is both lower bounded and upper bounded. On one hand, to satisfy the lower bound on the typicality of an entity i, the subset $W_G$ needs to be large enough. On another hand, the entity i should have enough coverage in the subset $W_G$, so the subset $W_G$ cannot be too large. Similar principles apply to an entity j of subset $W_G$ relative to the subset $U_G$.

For a group consisting of a subset $U_G$ of entities and a subset $W_G$ of entities, we can use the typicality and coverage to rank entities in the subsets $U_G$ of entities and a subset $W_G$. The rank of an entity can be computed based on any ranking function of the coverage and typicality. Examples of possible ranking functions for entities in the subset $U_G$ are $$\delta(j,U_G) \cdot \rho(j,U_G)$$

and $$\delta(j,U_G) + \rho(j,U_G).$$

Similar ranking functions for entities in the subset $W_G$ can be defined.

Using the above definitions, the computer executable instructions for identifying a group of entities is provided. The program can either start from the Set U, or the Set W, in the bipartite directed graph. In the case where the program starts with Set U, the Set A of entities used in the following is equal to Set U and Set B of entities is equal to set W. When the program starts with Set W, the Set A of entities used in the following is equal to Set W and Set B of entities is equal to set U. An example embodiment of the computer executable instructions includes: (a) for any set of entities from Set A, the computing device 2 finds the set of entities for Set B that are the most relevant for the set of entities from Set A; (b) for any set of entities from Set B, the computing device 2 finds the entities of Set A that are the most relevant for this set of entities from Set B; and (c), steps (a) and (b) form an iterative mutual reinforcement structure wherein, after performing these steps for multiple iterations, the entities from Set A and the entities from Set B will converge. The converging sets from Set A and from Set B form a resulting group or community. The following are the detailed descriptions of different modules of the method which are described with respect to FIGS. 8 through 13.

The algorithm of FIG. 8 "FIND ALL GROUPS", is the highest level of the algorithm, as it processes all the entities of Set A and finds the groups for each entity of Set A. The algorithm "FIND GROUPS FOR ENTITY", as per FIG. 9, describes how to find the groups for a given entity. This algorithm picks an initial set of entities from Set A based on the neighbour set of an entity within Set A. The neighbour set is computed according to the algorithm "NEIGHBOURS", as per FIG. 10. The algorithm "MUTUAL ITERATION", as per FIG. 11, describes the iterative mutual reinforcement operation, which uses the algorithms "TOP RELEVANT ENTITIES OF SET B" (see FIG. 12) and "TOP RELEVANT ENTITIES OF SET A" (see FIG. 13) to get entities from Set A and entities from Set B in each iteration.

In particular, turning to FIG. 8, the algorithm "FIND ALL GROUPS", uses the inputs Set A, Set B, $s_A$ (i.e. the maximal number of entities of Set A a group should have), and $s_B$ (i.e. the maximal number of entities of Set B a group should have) (block 90). For all entities i in the Set A (block 92), the algorithm "FIND GROUPS FOR ENTITY" is called (block 94), and the values i, $s_A$, and $s_B$, are passed through. The output are the groups $(A_G, B_G)$ (block 96).

Turning to FIG. 9, the algorithm "FIND GROUPS FOR ENTITY" uses as inputs the entity i of Set A, $s_A$ which is the maximal number of entities of Set A a group should have, and $s_B$ which is the maximal number of entities of Set B a group should have. The "NEIGHBOURS" algorithm is then called to identify the neighbouring entities of i (block 100), which are identified by $N_i$.

At block 102, while the set $N_i$ is not empty, a number of operations are executed. At block 104, the computing device 2 picks an entity j in the set $N_i$, and computes the set $N_j$ is using the "NEIGHBOURS" algorithm (block 106). The intersection $N_{ij} \leftarrow N_i \cap N_j$ is computed (108). The groups $(A_G, B_G)$ is then computed using the "MUTUAL ITERATION" algorithm (block 110), which uses the input $(N_{ij}, s_A, s_B)$. If the "MUTUAL ITERATION" algorithm finds a new group $(A_G, B_G)$ (block 112), then the computing device stores $(A_G, B_G)$ as a group (block 114). The value $N_i$ is then updated to be equal to the set difference $N_i \setminus N_{ij}$ (block 116). The output of the algorithm are all new groups $(A_G, B_G)$ that have been computed by the "MUTUAL ITERATION" algorithm (block 118).

Turning to FIG. 10, the "NEIGHBOURS" algorithm uses the input i, which is the ID of an entity in Set A (block 120). At block 122, the set $N_i$ is initialized to be equal to the empty set. At block 124, Bi is set equal to the set of entities of Set B with which entity i of set A is associated.

At block 126, for all items i in $B_i$, the following operations are executed. At block 128, the value $A_j$ becomes the set of entities of Set A with which the entity j of set B is associated. At block 130, the value $N_i$ becomes $N_i \cup A_j$.

At block 132, using the "NEIGHBORS" algorithm the set $N_i$, which is the set of neighbouring entities of i, is computed.

Turning to FIG. 11, the algorithm "MUTUAL ITERATION" includes the inputs $A_G$ (e.g. the initial set of entities of set A, and the values $s_A$ and $s_B$ (block 134).

At block 136, a number of operations are repeated until the sets $(A_G, B_G)$ converge (block 142). In particular, the algorithm TOP RELEVANT ENTITIES OF SET B is called, passing in input values $A_G$, and $s_B$ (block 138). Then the algorithm TOP RELEVANT ENTITIES OF SET A is called, passing in input values $B_G$, and $s_A$ (block 140).

At block 144, the algorithm outputs the group $(A_G, B_G)$.

Figure 12:
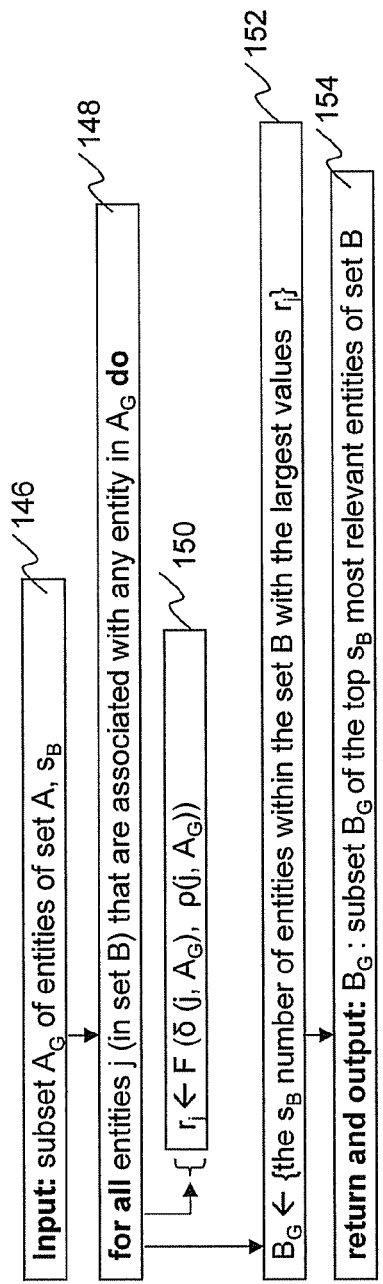
FIG. 12 is a flow diagram illustrating example computer executable instructions for identifying the top relevant entities of one set, according to a function called in FIG. 11.

Turning to FIG. 12, the algorithm "TOP RELEVANT ENTITIES OF SET B" is provided, which uses the inputs $A_G$ and $s_B$ (block 146). At block 148, for all entities j of set B that are associated with any entity in $A_G$, the following computation is made: $r_j$ is computed using a ranking function $F(\delta(j,A_G), \rho(j,A_G))$ which depends on typicality and coverage of entity j with respect to the subset $A_G$ (block 150). As an example embodiment of the ranking functions, the ranking value $r_j$ of entity j is set equal to $\delta(j,A_G) \cdot \rho(j,A_G)$ which is equal to the product of the coverage and typicality of entity j with respect to the set $A_G$.

Based on such computation, $B_G$ is set equal to the subset of Set B comprising the $s_B$ number of entities within Set B which have the largest ranking value (block 152). The subset $B_G$ is then outputted (block 154).

Figure 13:
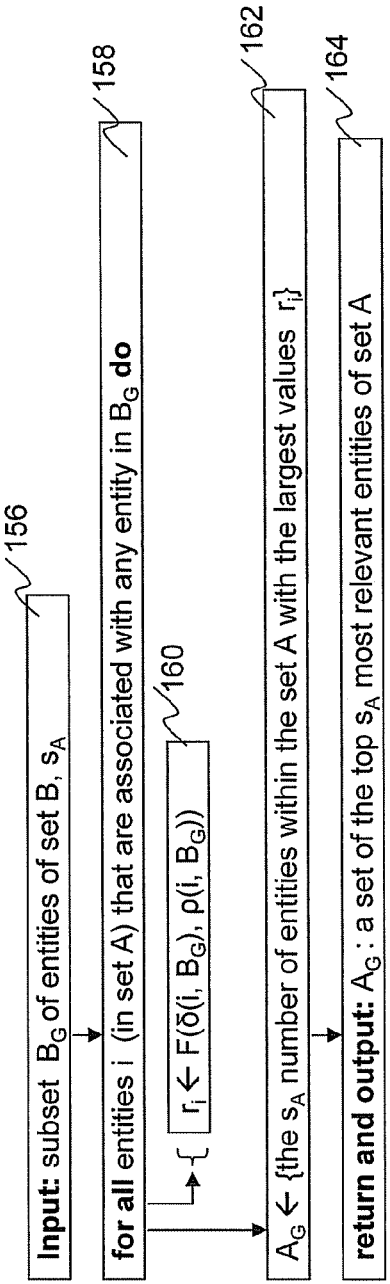
FIG. 13 is a flow diagram illustrating example computer executable instructions for identifying the top relevant entities of another set, according to a function called in FIG. 11.

Turning to FIG. 13, the algorithm "TOP RELEVANT ENTITIES OF SET A" is provided, which uses the inputs $B_G$ and $s_A$ (block 156). At block 158, for all entities i of set A that are associated with any entity in $B_G$, the following computation is made: $r_i$ is computed using a ranking function $F(\delta(j,B_G), \rho(j,B_G))$ that depends on typicality and coverage of entity i with respect to the subset $B_G$ (block 160). As an example embodiment of the ranking functions, the ranking value $r_i$ of entity i is set equal to $\delta(j,B_G) \cdot \rho(j,B_G)$ which is equal to the product of the coverage and typicality of entity i with respect to the set $B_G$.

Based on such computation, $A_G$ is set equal to the subset of Set A comprising the $s_A$ entities within the Set A which have the largest ranking value (block 162). The subset $A_G$ is then outputted (block 164).

It can be appreciated that variations of the above methods may be used in order to improve the performance. For example, the quality of the resulting group and the time complexity can be improved.

In an example variation of the algorithm FIND ALL GROUPS, the principled algorithm goes through all entities within the Set A, which is not necessary for finding all groups or communities. In some cases, performing the algorithm on a small fraction of entities can already discover most of the groups. Therefore, in an example variation, the computing device skips over (e.g. does not compute the algorithm FIND ALL GROUPS) for entities of set A that are associated with too few or too many entities from Set B. In other words, the computing device 2 only computes the algorithm for entities of Set A that are associated with a reasonable number of entities of Set B. Another example variation which reduces the number of entities to be processed is to select a randomly sampled subset of the entities from Set A.

In an example variation of FIND GROUPS FOR ENTITY, conditions are added to skip over or reduce the number of entities from the Set A which are being processed. For example, let $\overline{A}$ be the union of the entities from Set A of all found groups. If the size of the set $N_i \backslash \overline{A}$ is smaller than some threshold, then the computing device 2 skips over the entity i of Set A, since the resulting group obtained from this initial set will be the same as an existing group with high probability.

In another example embodiment of the algorithm FIND GROUPS FOR ENTITY, the values of $s_A$ and $s_B$ are selected such that the sizes of the sets of entities are used to affect the quality of the resulting group and time complexity of the algorithm. These two parameters can be fine tuned experimentally. In an example embodiment, $s_B$ is sized to be approximately the same as the average number of associations between an entity of Set B and the entities of Set A. Similarly, $s_A$ is sized to be approximately the same as the average number of associations between an entity of Set A and the entities of Set B.

To determine whether a resulting group is new (see block 112 for example), when a group is generated, it is compared with all the found groups. A new generated group is denoted by $G_r$ and a found or existing group is denoted by $G_e$. In an example embodiment of FIND GROUPS FOR ENTITY, the computing device 2 computes a value representing the similarity between the resulting group and each of the found group. There are different possible ways to compute the similarity. An example of such a similarity computation is provided herein. Let $G_r = (A_r, B_r)$ be the resulting group and $G_e = (A_e, B_e)$ be an existing group. It can be appreciated that $A_r$ and $B_r$ are subsets of the Set A and the Set B, respectively, of the newly generated group $G_r$. Similarly, $A_e$ and $B_e$ are subsets of the Set A and the Set B, respectively, of the existing group $G_e$. The similarity $S(G_r, G_e)$ can be calculated as follows.

$$S(G_r, G_e) = \frac{\sum_{j \in B_r \cap B_e} \delta(j, A_e)}{\sum_{j \in B_e} \delta(j, A_e)}$$

This similarity measure takes into account the set of entities from Set B. Moreover, the computing device 2 can also compare the set of entities from Set A to determine the similarity between groups. More generally, the similarity is determined according to both the sets of entities from Set A and from Set B.

The NEIGHBOURS algorithm can also have variations. It is recognized that the neighbour set obtained directly from the NEIGHBOURS algorithm can be large, which may slow down the algorithm. Therefore, an example embodiment of the NEIGHBOURS algorithm is provided, which reduces the size of the neighbour set. One way is to look at the number of common entities of Set B that are shared by an entity i and another entity j, wherein both entities i and j are of the Set A. In other words, the number of common interactions between the entities i and j are considered. The entity j is put into the neighbour set of the entity i only if the number of interactions between entities i and j is larger than some threshold.

Another example embodiment of NEIGHBOURS which reduces the size of neighbour set includes reducing the size of the set of entities from Set B with which the entities from Set A are associated or interact. For example, the computing device 2 only considers the entities from Set B that do not belong to any existing groups, and only count the number of interactions on these entities. In other words, the number of common entities of Set B which do not belong to any existing group are used in the NEIGHBOURS algorithm. Another approach is to avoid counting the interactions on the entities from Set B with a high coverage value.

The MUTUAL ITERATION algorithm can also variations. The principled algorithm keeps running until the sets from Set A and Set B converge. However, if the number of iterations needed for convergence is very large, it means the initial set if not a good indicator of a real group and the resulting group will probably be of low quality. Therefore, in an example implementation of the MUTUAL ITERATION algorithm, there is a maximum number of iterations. In other words, if the sets from Set A and Set B do not converge after the given number of iterations, then the computing device 2 terminates or ends the iteration and returns the result "no group found". This heuristic can reduce the time complexity and guarantee the quality of the resulting group.

The algorithms TOP RELEVANT ENTITIES OF SET B and TOP RELEVANT ENTITIES OF SET A also have variations. These two algorithms similar and, thus, with for the sake of simplicity, the algorithm TOP RELEVANT ENTITIES OF SET B is discussed. However, the principles apply to both algorithms. First, the expression of $r_j$, which in the algorithm is a product of the typicality and coverage values, can have different variations. For example, the expression $r_j$ can be a result of the typicality value only, or the coverage value only. In another example embodiment, $r_j$ is the product of the coverage value and the square of the typicality value. This is to give the typicality value a greater impact compared to the coverage value.

To speed up the algorithm TOP RELEVANT ENTITIES OF SET B, the computing device 2 can divide the entities from Set B into subsets to reduce the number of entities are processed to compute $r_j$. An example approach is to divide Set B into different subsets according to the number of associations with entities in Set A. Then, the computing device 2 performs the MUTUAL ITERATION algorithm on each subset in Set B. This approach can be much faster than directly performing the algorithm on the whole set of entities in Set B.

It can be appreciated that after the "FIND GROUPS FOR ENTITY" algorithm has been executed, there may be post-processing. Further details describing the post-processing are provided below.

Entities from Set A and from Set B may be inserted into a group after the group has been formed. The groups built by the above algorithms may not include all entities from Set A and Set B. For example, some entities from Set A and Set B do not belong to any group because they do not have sufficiently high typicality or coverage values, or both. However, the computing device 2 can still insert an entity (e.g. of Set A) into certain groups as long as the entity is associated with entities (e.g. of Set B) which belong to a known group ($A_G, B_G$). For example, if an entity i (e.g. of Set A) is associated with some entities of set BG, then the entity i might be inserted into group ($A_G, B_G$). To decided whether entity i should be inserted into group ($A_G, B_G$), the computing device 2 can compute the typicality and the coverage values of the entity i with respect to the set $B_G$. The same approach can be applied for inserting entities of Set B into the group ($A_G, B_G$). If after one iteration of insertion, the groups still do not cover all the entities from Sets A and B, the computing device can perform the insertion process for more iterations, until eventually all the entities have been processed, or no new entities have been inserted during one iteration step.

In another example of post-processing, the identified groups can be merged together. Some groups discovered by the algorithm may be merged since they are similar to each other. The similarities are computed between groups by comparing their sets of entities from Set A and Set B. For example, if two groups have sufficiently large overlaps in both the subset from Set A and the subset from Set B, then the computing device 2 merges the two groups into one groups whose user set and Set A are the unions of the subsets of Set A from the two groups, and merges the subsets of Set B from the two groups.

In another example of post-processing, the identified groups can be organized according to hierarchy. After identifying groups, the computing device 2 considers the sets from Set A of the groups as the new "entities" in the algorithm. If an entity of Set B has a large enough coverage over set of entities from Set A, then the computing device 2 establishes that there is an association from the corresponding "new entity" from Set A to the entity from Set B, where each "new entity" is a previously computed group. Then a new entity A-entity B bipartite directed graph is formed, and the same algorithm can be performed on the new bipartite directed graph. By computing the algorithm, the computing device 2 can identify new "higher level" groups where the new sets from Set A are subsets of the old sets from Set A. In other words, if the several lower level groups share something in common, they will appear in the same higher level group. Different parameters are adjustable such as the threshold of the coverage and the sizes $s_A$ and $s_B$ for the higher level groups.

The following is list of notations used in an analysis of the above methods.

$n_o$: total number of entities within Set B;
$n_u$: total number of entities within Set A;
$n_c$: total number of groups;
$m_o$: number of entities from Set B that are part of a group;
$m_u$: number of entities from Set A that are part of a group;
k: number of entities from Set B that one entity from Set is associated with;
$c_o$: number of groups that one entity from Set B belongs to;
$c_u$: number of groups that one entity from Set A belongs to;
$q_u$: overlap parameter between groups comprising entities from Set A;
$q_o$: overlap parameter between groups comprising entities from Set B;

In the below sections, a model is described which is used for analysis.

It is assumed that there are $n_c$ groups or communities, each of which consists of $m_o$ entities from Set B and $m_u$ entities from Set A. The groups can overlap with one another in both the set (from Set A) and the set (from Set B). The associations between the entities from Set A and Set B are generated in the following way. When an entity from Set A wishes to be associated with an entity from Set B (e.g. by visiting the entity of Set B), the entity from Set A first randomly chooses one of $c_u$ groups that it belongs to, and then randomly choose one of the $m_o$ entities in that group.

One observation to this model is that, assuming that there is overlap between entity sets from Set A and no overlap between sets from Set B, let q be the fraction of overlapping between the set (from Set A) of the two groups. Then for an entity from Set B with r associations with entities in Set A, the probability that all the associations are from the overlapping part is in the order of $q^r$, which is small if q is small or r is large. Thus, this is used to identify whether a set of entities from Set A is a subset of the overlapping part of sets (of Set A) of different groups.

The following is an analysis on a simplified model, which considers horizontal overlapping. The following assumptions are made with the purpose of simplifying the analysis.

1. All the groups have fixed size in terms of both entities of Set A and Set B, i.e. all the groups have the same $m_u$ and $m_o$.

2. The number of groups that an entity of Set A belongs to is upper bounded by $c_u$; and the number of groups that an entity of Set B belongs to is upper bounded by $c_o$.

3. All the entities of Set A have the same k, i.e. all the entities of Set A visit the same number of entities of Set B.

4. All entities of Set B in a group have equal probabilities to be chosen by an entity from Set A in this group; and all entities of Set B outside this group have zero probability to be chosen.

5. Under these assumptions, the answer to the question of whether the groups can be identified is determined by a trade off between $c_o$ and $q_u$, as well as $c_u$ and $q_o$.

In view of the above, the following propositions are made.

Proposition 1: The groups can be detected using the previous algorithm if $q_u < 1/c_o$ or $q_o < 1/c_u$.

The intuition behind this proposition is that, if an entity from Set B belongs to $c_o$ groups, then each of these $c_o$ groups will be expected to contribute a fraction $1/c_o$ of entities from Set A on the entity from Set B (which is based on the assumption of the fixed $m_u$); and for a part of fraction $q_u$, the probability this part putting more than $1/c_o$ entities from Set A on an entity from Set B is small when $q_u < 1/c_o$. A simplest special case is that when $c_o = 1$, groups can be found as long as $q_u < 1$, which is the scenario for the previous algorithm.

The assumption of fixed $m_u$ can be relaxed. If the $m_u$'s are different for different groups, the upper bound on $q_u$ will be lower. To make sure that the upper bound on $q_u$ is not too small, the variance of the sizes of groups of entities from Set A should be upper bound.

Roughly, the upper bound can be set according to the following:

$$q_u < \frac{\min\{m_u\}}{c_o \cdot \overline{m}_u}$$

where $\min\{m_u\}$ is the minimum size of a group of entities from Set A and $\overline{m}_u$ is the average size of the groups. It can be seen that in order to make the upper bound on $q_u$ higher, $\min\{m_u\}$ should be close to $\overline{m}_u$.

1) Relation among $m_o$, $n_o$, $c_o$, $q_o$ and $n_c$: The average size of a group is $$\overline{m}_u = \frac{n_o \cdot c_o}{n_c}$$

The expected overlap between two groups is $$\overline{q}_o = \frac{\overline{m}_o}{n_o} = \frac{c_o}{n_c}$$

The same principles apply for $m_u$, $n_u$, $c_u$, $q_u$ and $n_u$ because of symmetry. Then the condition in Proposition 1 can be written as follows $$q_u < \frac{1}{c_o} \text{ or } q_o < \frac{1}{c_u}$$

which are roughly equivalent to $$\frac{c_u}{n_c} < \frac{1}{c_o} \text{ or } \frac{c_o}{n_c} < \frac{1}{c_u}$$

which is $$c_u \cdot c_o < n_c$$

Thus, if the condition $c_u \cdot c_o < n_c$ is satisfied, it can be said that a vast majority of the groups satisfy the condition in Proposition 1 and these groups can be detected by the clustering algorithm. Moreover, the condition $c_u \cdot c_o < n_c$ can be satisfied globally as well as locally. For example when computing a distributed algorithm, the computing device 2 can check a subset of entities from Set A and a subset of entities from Set B with the condition $c_u \cdot c_o < n_c$, and determine whether it is possible to detect the groups within this subset.

In a preferred example embodiment, the sizes of the groups do not vary largely. With a fixed mean size of groups, the larger the variance is, the fewer groups that can be detected. For example, if the minimum size of the groups is much smaller than the mean size, then the computing device 2 may correctly detect the groups between which there are very small overlaps. Thus in the group detection algorithm, the range of size of the groups is declared.

Another preferred example condition involves a trade-off between c and $c_o$. Intuitively, if the entities of Set A are associated widely with many different entities of Set B, then the entities of Set B should be more "typical". Condition $c_u \cdot c_o < n_c$ can be checked in a distributed manner, which means the computing device 2 can determine how well the algorithm can detect the groups within a subset of entities from Set A and Set B.

The above are only approximate conditions that can help fine tune the algorithm for identifying groups. Each operation may be made more precise by considering distributions of quantities, such as the sizes of the groups and the number of groups that an entity belongs to. Additionally, probabilistic bounds can be used to describe the performances more precisely.

Another model is provided in the post-processing analysis. The model includes the characteristic that there is noise when entities in Set U are associated with entities in Set W. In other words, with a certain probability, a given entity is randomly associated instead of being associated according to the preference vector.

Such a model is defined as follows:

1. Groups of entities from Set B do not overlap while groups of entities from Set A do overlap.
2. An entity from Set A chooses an entity from Set B in the groups that it belongs to with probability ρ, and also chooses any item outside the groups with probability η.

The fraction of entities from Set A that are associated with an entity from Set B, which are from the group that the entity from Set B belongs to is roughly as follows $$\varepsilon = \frac{p \cdot m_u \cdot c_u}{p \cdot m_u \cdot c_u + n_u \cdot \eta}$$

Using the previous algorithm, the computing device 2 detects the groups between which the overlap factor satisfies $q_u < 1$. For example, if it is satisfied that $$n = o\left(\frac{p \cdot m_u \cdot c_u}{n_u}\right) \text{ where } p = O\left(\frac{1}{m_o \cdot c_u}\right)$$

then we will have $\varepsilon \rightarrow 1$ and the computing device 2 can detect all the groups between which the overlap factor $q_n < 1$.

In the algorithm, $\varepsilon$ is selected according to the noise factor η. If too large $\varepsilon$ is selected, some groups affected by the noise will be considered as an overlapping part and may not be recognized. If too small a $\varepsilon$ is selected, overlapping parts with a fraction larger than δ will be recognized as whole groups.

By symmetry, similar analysis can be applied to the case where groups of entities from Set A do not overlap while groups of entities from Set B do overlap.

The systems and methods described herein provide several benefits for identifying a group or entities or a community of entities. The systems and methods are able to quickly find communities, even when provided with large amounts of data. As described above, computations for each entity can be executed in parallel when identifying a subset.

Additionally, little input is required to find a group. The process is automatic and is performed by the computing device 2. For example, an initial subset, such as one or more entities, is used to find possible groups. Notably, the initial subset may or may not be part of the identified groups.

The systems and methods described herein are also flexible. They can be used with many different types of data, and the associations can also be of different types. Sets A and Sets B are exchangeable, and this leads to a simple design.

There are also many applications for which the systems and methods described herein can be used. In particular, rankings of entities within a group are provided, and this can be applied to determine which search results are most relevant (e.g. based on the rankings).

In an example embodiment, words are considered one type of entity (e.g. Set A) and users are considered another type of entity (e.g. Set B). The associations between the words and the entities are defined by a user using a word, for example posting a word in a message. A group of words and entities can then be found using the systems and methods described herein. For example, a word such as "basketball" is used as an initial subset. The algorithm then finds users who are associated to the word "basketball". Other words are then found related to the identified users, for example, "sports", "NBA", etc. The algorithm continues to seek out associated users and words to provide a group. The most relevant words and the most relevant users (e.g. based on the rankings) in the group are then provided.

In general, a method is provided for determining whether a group of entities can be extracted from an initial set of data. The initial set of data is represented by a bipartite graph comprising a Set A and a Set B, and the method performed by a computing device having access to associations between the entities of the Set A and the Set B. The method includes obtaining the initial set of data comprising a subset $S_{A1}$ of the Set A, the subset $S_{A1}$ comprising one or more entities. The method further includes computing a process to identify other entities within the group, the process comprising: computing a subset $S_{B1}$ of the Set B that is associated with the subset $S_{A1}$; and computing a subset $S_{A2}$ of the Set A that is associated with the subset $S_{B1}$. Upon stopping the process, it is determined if $S_{A2}$ and $S_{B1}$ are within the group.

In another aspect, method further comprises determining whether to iterate the process or stop. In another aspect, if the process is iterated, the process can be more generally represented by computing a subset $S_{Bk}$ of the Set B that is associated with the subset $S_{Ak}$, and computing a subset $S_{Ak+1}$ of the Set A that is associated with the subset $S_{Bk}$, where k increments by one with each iteration. In another aspect, one or more candidate groups are generally represented by $G_k$ and formed by the subsets $S_{AK}$, $S_{BK}$, and are stored in a database. In another aspect, the method further comprises determining one or more groups are within the candidates groups $G_k$, for all values of k. In another aspect, the process is stopped if the subsets of the Set A or the Set B, or both, converge. In another aspect, the subsets of the Set A converge if a pattern in the subsets of the Set A are detected, and the subsets of the Set B converge if a pattern in the subsets of the Set B are detected. In another aspect, the process is stopped if a predetermined number of iterations have been computed. In another aspect, the process is stopped if any one of the subsets of the Set A or the Set B has a number of entities that is greater than a maximum threshold or less than a minimum threshold. In another aspect, an entity of the Set B is part of the subset SBS if a ranking function returns an output above a threshold, wherein a typicality value or a coverage value, or both, of the entity are inputs to the ranking function. The typicality value is computed by comparing: one or more associations between the entity and the subset $S_{A1}$, with one or more associations between the entity and the Set A. The coverage value is computed by comparing: one or more associations between the entity and the subset $S_{A1}$, with all entities within the subset $S_{A1}$. In another aspect, if there are multiple entities in the Set B, the typicality value and the coverage value of each one of the multiple entities are computed in parallel to determine which ones of the multiple entities are part of the subset $S_{B1}$. In another aspect, an entity of the Set A is part of the subset $S_{A2}$ if a ranking function returns an output above a threshold, wherein a typicality value or a coverage value, or both, of the entity are inputs to the ranking function. The typicality value is computed by comparing: one or more associations between the entity and the subset $S_{B1}$, with one or more associations between the entity and the Set B. The coverage value is computed by comparing: one or more associations between the entity and the subset $S_{B1}$, with all entities within the subset $S_{B1}$. In another aspect, if there are multiple entities in the Set A, the typicality value and the coverage value of each one of the multiple entities are computed in parallel to determine which ones of the multiple entities are part of the subset $S_{A2}$. In another aspect, the Set A comprises one or more users and the Set B comprises one or more websites able to be visited by the one or more users. In another aspect, the Set A comprises one or more words and the Set B comprises one or more users which are able to use the one or more words. In another aspect, another computing device, in communication with the computing device, provides the initial set of data comprising the subset $S_{A1}$.

In general a method is also provided for computing a typicality value and a coverage value of an entity of a second set of entities. The method includes obtaining a first set of entities, a subset of the first set, and the entity of the second set, wherein the first set of entities and the second set of entities are represented in a bipartite directed graph; obtaining one or more associations between the entity of the second set and the first set; obtaining one or more associations between the entity of the second set and the subset of the first set; and obtaining one or more associations between the subset of the first set and the second set. The typicality value is computed by comparing "the associations between the entity of the second set and the subset of the first set" with "the associations between the entity of the second set and the first set". The coverage value is computed by comparing "the associations between the entity of the second set and the subset of the first set" with "the associations between the subset of the first set and the second set".

In another aspect, the method further comprises, upon determining a ranking function returns an output above a threshold, establishing that the entity is part of a subset of the second set. The typicality value or the coverage value, or both, are inputs to the ranking function.

In another aspect, the typicality value is computed by $$\delta(j, A_G) = \frac{|A_j \cap A_G|}{|A_j|},$$

and the coverage value is computed by $$\rho(j, A_G) = \frac{|A_j \cap A_G|}{|A_G|},$$

wherein:
j represents the entity of the second set;
$A_j$ represents a set of entities within the first set with which the entity of the second set is associated; and
$A_G$ is the subset of the first set.

The steps or operations in the flow charts described herein are just for example. There may be many variations to these steps or operations without departing from the spirit of the invention or inventions. For instance, the steps may be performed in a differing order, or steps may be added, deleted, or modified.

Although the above principles have been described with reference to certain specific embodiments, various modifications thereof will be apparent to those skilled in the art without departing from the scope of the claims appended hereto.

The invention claimed is:

1. A method performed by a computing device for determining whether a group of entities can be extracted from an initial set of data, the method comprising:
   the computing device representing the initial set of data as a bipartite directed graph comprising a Set A of entities and a Set B of entities, and wherein the computing device uses a communication device to access the initial set of data comprising the entities of the Set A and the Set B;
   obtaining the initial set of data further comprising a subset $S_{A1}$ of the Set A, the subset $S_{A1}$ comprising multiple entities;
   computing an iterative process to identify other entities within the group comprising:
      inputting the subset $S_{A1}$ into the iterative process;
      in a first iteration:
         computing a subset $S_{B1}$ of the Set B that is associated with the subset $S_{A1}$, the subset $S_{B1}$ comprising multiple entities of the Set B, wherein the computing device executes parallel and independent computations from each other to identify each one of the entities of the subset $S_{B1}$;
         storing in a database on the computing device a candidate group comprising the subsets $S_{A1}$ and $S_{B1}$;
      in one or more subsequent iterations:
         computing a subset $S_{A(K+1)}$ of the Set A that is associated with the subset-$S_{BK}$, where K is at least 1 and represents, and increments with, a number of the iterations, wherein the computing device executes parallel and independent computations from each other to identify each one of the entities of the subset $S_{A(K+1)}$;
         computing a subset $S_{B(K+1)}$ of the Set B that is associated with the subset $S_{A(K+1)}$, wherein the computing device executes parallel and independent computations from each other to identify each one of the entities of the subset $S_{B(K+1)}$;
         storing in the database a candidate group comprising the subsets $S_{A(K+1)}$ and $S_{B(K+1)}$;
   at each of the iterations within the iterative process, detecting whether a stop condition exists, the stop condition comprising detecting converged subsets of Set A or detecting converged subsets of Set B, or both;
   stopping the iterative process after detecting the stop condition exists and outputting a group of entities comprising the converged subsets of Set A or the converged subsets of Set B, or both.

2. The method of claim 1 wherein the subsets of the Set A converge if a pattern in the subsets of the Set A are detected, and the subsets of the Set B converge if a pattern in the subsets of the Set B are detected.

3. The method of claim 1 wherein the stop condition further comprises detecting that a predetermined number of iterations have been computed.

4. The method of claim 1 wherein the stop condition further comprises detecting that any one of the subsets of the Set A or the Set B has a number of entities that is greater than a maximum threshold or less than a minimum threshold.

5. The method of claim 1 wherein, in the first iteration, an entity of the Set B is part of the subset $S_{B1}$ if a ranking function returns an output above a threshold, wherein a typicality value or a coverage value, or both, of the entity are inputs to the ranking function;
   and wherein the typicality value is computed by comparing:
      one or more associations between the entity and the subset $S_{A1}$, with
      one or more associations between the entity and the Set A;
   and wherein the coverage value is computed by comparing:
      one or more associations between the entity and the subset $S_{A1}$, with
      all entities within the subset $S_{A1}$.

6. The method of claim 5 wherein, if there are multiple entities in the Set B, the typicality value and the coverage value of each one of the multiple entities are computed in parallel to determine which ones of the multiple entities are part of the subset $S_{B1}$.

7. The method of claim 1 wherein, in a second iteration of the iterative process, an entity of the Set A is part of a subset $S_{A2}$ if a ranking function returns an output above a threshold, wherein a typicality value or a coverage value, or both, of the entity are inputs to the ranking function;
   and wherein the typicality value is computed by comparing:
      one or more associations between the entity and the subset $S_{B1}$, with
      one or more associations between the entity and the Set B;
   and wherein the coverage value is computed by comparing:
      one or more associations between the entity and the subset $S_{B1}$, with
      all entities within the subset $S_{B1}$.

8. The method of claim 7 wherein, if there are multiple entities in the Set A, the typicality value and the coverage value of each one of the multiple entities are computed in parallel to determine which ones of the multiple entities are part of the subset $S_{A2}$.

9. The method of claim 1 wherein the Set A comprises one or more users and the Set B comprises one or more websites able to be visited by the one or more users.

10. The method of claim 1 wherein the Set A comprises one or more words and the Set B comprises one or more users which are able to use the one or more words.

11. The method of claim 1 wherein another computing device, in communication with the computing device, provides the initial set of data comprising the subset $S_{A1}$.

12. A method of computing a group of entities, the method performed by a computing device, the method comprising:
   the computing device using a communication device to access a first set of entities and a second set of entities;
   the computing device computing an iterative process comprising multiple iterations, and in a given one of the iterations the iterative process comprising:
   obtaining a first set of entities, a subset of entities of the first set, and at least a first entity and a second entity of the second set of entities, wherein the first set of entities and the second set of entities are represented in a bipartite directed graph;
   computing a process for the first entity in the second set, comprising: obtaining one or more associations between the first entity of the second set and the first set; obtaining one or more associations between the first entity of the second set and the subset of the first set; obtaining one or more associations between the subset of the first set and the second set; and computing a typicality value associated with the first entity of the second set by comparing:

the associations between the first entity of the second set and the subset of the first set with the associations between the first entity of the second set and the first set; and, the process for the first entity in the second set further comprising, after determining a ranking function returns an output above a threshold, establishing that the first entity is part of a subset of the second set, wherein the typicality value is an input to the ranking function;

computing a same process for the second entity of the second set as the first entity of the second set, wherein the computing device computes the same process in parallel and independently from computing the process for the first entity of the second set; and wherein each iteration in the iterative process results in subsets of the first set and subsets of the second set, and the iterative process stops after detecting that the subsets of the first set converge, or the subsets of the second set converge, or both.

13. The method of claim 12 wherein the typicality value is computed by $$\delta(j, A_G) = \frac{|A_j \cap A_G|}{|A_j|},$$

wherein:
j represents the first entity of the second set;
$A_j$, represents a set of entities within the first set with which the first entity of the second set is associated; and
$A_G$ is the subset of the first set.

14. A computing system for determining whether a group of entities can be extracted from an initial set of data, the computing system comprising:

a communication device to access the initial set of data comprising the entities of a Set A and a Set B;

a processor to represent the initial set of data as a bipartite directed graph comprising the Set A of entities and the Set B of entities;

memory to store the bipartite directed graph;

the processor further configured to obtain the initial set of data further comprising a subset $S_{A1}$ of the Set A, the subset $S_{A1}$ comprising multiple entities;

the processor further configured to compute an iterative process to identify other entities within the group, the iterative process comprising:

inputting the subset $S_{A1}$ into the iterative process;

in a first iteration:

computing a subset $S_{B1}$ of the Set B that is associated with the subset $S_{A1}$, the subset $S_{B1}$ comprising multiple entities of the Set B, wherein the computing system executes parallel and independent computations from each other to identify each one of the entities of the subset $S_{B1}$;

storing in a database in the memory a candidate group comprising the subsets $S_{A1}$ and $S_{B1}$;

in one or more subsequent iterations:

computing a subset $S_{A(K+1)}$ of the Set A that is associated with the subset-$S_{BK}$, where K is at least 1 and represents, and increments with, a number of the iterations, wherein the computing system executes parallel and independent computations from each other to identify each one of the entities of the subset $S_{A(K+1)}$;

computing a subset $S_{B(K+1)}$ of the Set B that is associated with the subset $S_{A(K+1)}$, wherein the computing system executes parallel and independent computations from each other to identify each one of the entities of the subset $S_{B(K+1)}$;

storing in the database a candidate group comprising the subsets $S_{A(K+1)}$ and $S_{B(K+1)}$;

the processor further configured to, at each of the iterations within the iterative process, detect whether a stop condition exists, the stop condition comprising detecting converged subsets of Set A or detecting converged subsets of Set B, or both;

the processor further configured to stop the iterative process after detecting the stop condition exists and output a group of entities comprising the converged subsets of Set A or the converged subsets of Set B, or both.

15. A computing system for computing a group of entities, the computing system comprising:

a communication device to access a first set of entities and a second set of entities;

memory for storing a first set of entities, a subset of entities of the first set, and at least a first entity and a second entity of the second set of entities, wherein the first set of entities and the second set of entities are represented in a bipartite directed graph;

a processor configured to compute an iterative process comprising multiple iterations, and in a given one of the iterations, the iterative process comprising:

computing a process for the first entity in the second set, comprising: obtaining one or more associations between the first entity of the second set and the first set; obtaining one or more associations between the first entity of the second set and the subset of the first set; obtaining one or more associations between the subset of the first set and the second set; and computing a typicality value associated with the first entity of the second set by comparing:

the associations between the first entity of the second set and the subset of the first set with the associations between the first entity of the second set and the first set; and, the process for the first entity in the second set further comprising, after determining a ranking function returns an output above a threshold, establishing that the first entity is part of a subset of the second set, wherein the typicality value is an input to the ranking function;

computing a same process for the second entity of the second set as the first entity of the second set, wherein the computing system computes the same process in parallel and independently from computing the process for the first entity of the second set; and wherein each iteration in the iterative process results in subsets of the first set and subsets of the second set, and the iterative process stops after detecting that the subsets of the first set converge, or the subsets of the second set converge, or both.

16. The computing system of claim 14 wherein the subsets of the Set A converge if a pattern in the subsets of the Set A are detected, and the subsets of the Set B converge if a pattern in the subsets of the Set B are detected.

17. The computing system of claim 14 wherein the stop condition further comprises detecting that a predetermined number of iterations have been computed.

18. The computing system of claim 14 wherein the stop condition further comprises detecting that any one of the subsets of the Set A or the Set B has a number of entities that is greater than a maximum threshold or less than a minimum threshold.

19. The computing system of claim 14 wherein, in the first iteration, an entity of the Set B is part of the subset $S_{B1}$ if a ranking function returns an output above a threshold, wherein a typicality value or a coverage value, or both, of the entity are inputs to the ranking function;
and wherein the typicality value is computed by comparing:
one or more associations between the entity and the subset $S_{A1}$, with
one or more associations between the entity and the Set A;
and wherein the coverage value is computed by comparing:
one or more associations between the entity and the subset $S_{A1}$, with
all entities within the subset $S_{A1}$.

20. The computing system of claim 19 wherein, if there are multiple entities in the Set B, the typicality value and the coverage value of each one of the multiple entities are computed in parallel to determine which ones of the multiple entities are part of the subset $S_{B1}$.

21. The computing system of claim 14 wherein, in a second iteration of the iterative process, an entity of the Set A is part of a subset $S_{A2}$ if a ranking function returns an output above a threshold, wherein a typicality value or a coverage value, or both, of the entity are inputs to the ranking function;
and wherein the typicality value is computed by comparing:
one or more associations between the entity and the subset $S_{B1}$, with
one or more associations between the entity and the Set B;
and wherein the coverage value is computed by comparing:
one or more associations between the entity and the subset $S_{B1}$, with
all entities within the subset $S_{B1}$.

22. The computing system of claim 21 wherein, if there are multiple entities in the Set A, the typicality value and the coverage value of each one of the multiple entities are computed in parallel to determine which ones of the multiple entities are part of the subset $S_{A2}$.

23. The computing system of claim 14 wherein, the Set A comprises one or more users and the Set B comprises one or more websites able to be visited by the one or more users.

24. The computing system of claim 14 wherein, the Set A comprises one or more words and the Set B comprises one or more users which are able to use the one or more words.

25. The computing system of claim 14 wherein, another computing device, in communication with the computing system, provides the initial set of data comprising the subset $S_{A1}$.

26. The computing system of claim 15 wherein the typicality value is computed by $$\rho(j, A_G) = \frac{|A_j \cap A_G|}{|A_j|},$$

wherein:
j represents the first entity of the second set;
$A_j$ represents a set of entities within the first set with which the first entity of the second set is associated; and
$A_G$ is the subset of the first set.

27. A non-transitory computer readable medium storing executable instructions for determining whether a group of entities can be extracted from an initial set of data, the executable instructions, that when executed by a computing system, cause the computing system to at least:
represent the initial set of data as a bipartite directed graph comprising a Set A of entities and a Set B of entities, and wherein a communication device of the computing system is used to access the initial set of data comprising the entities of the Set A and the Set B;
obtain the initial set of data further comprising a subset $S_{A1}$ of the Set A, the subset $S_{A1}$ comprising multiple entities;
compute an iterative process to identify other entities within the group comprising:
inputting the subset $S_{A1}$ into the iterative process;
in a first iteration:
computing a subset $S_{B1}$ of the Set B that is associated with the subset $S_{A1}$, the subset $S_{B1}$ comprising multiple entities of the Set B, wherein the computing device executes parallel and independent computations from each other to identify each one of the entities of the subset $S_B$;
storing in a database on the computing device a candidate group comprising the subsets $S_A$, and $S_{B1}$;
in one or more subsequent iterations:
computing a subset $S_{A(K+1)}$ of the Set A that is associated with the subset $S_{BK}$, where K is at least 1 and represents, and increments with, a number of the iterations, wherein the computing device executes parallel and independent computations from each other to identify each one of the entities of the subset $S_{A(K+1)}$;
computing a subset $S_{B(K+1)}$ of the Set B that is associated with the subset $S_{A(K+1)}$, wherein the computing device executes parallel and independent computations from each other to identify each one of the entities of the subset $S_{B(K+1)}$;
storing in the database a candidate group comprising the subsets $S_{A(K+1)}$ and $S_{B(K+1)}$;
at each of the iterations within the iterative process, detect whether a stop condition exists, the stop condition comprising detecting converged subsets of Set A or detecting converged subsets of Set B, or both;
stop the iterative process after detecting the stop condition exists and outputting a group of entities comprising the converged subsets of Set A or the converged subsets of Set B, or both.

28. The non-transitory computer readable medium of claim 27 wherein the subsets of the Set A converge if a pattern in the subsets of the Set A are detected, and the subsets of the Set B converge if a pattern in the subsets of the Set B are detected.

29. The non-transitory computer readable medium of claim 27 wherein the stop condition further comprises detecting that a predetermined number of iterations have been computed.

30. The non-transitory computer readable medium of claim 27 wherein the stop condition further comprises detecting that any one of the subsets of the Set A or the Set B has a number of entities that is greater than a maximum threshold or less than a minimum threshold.

31. The non-transitory computer readable medium of claim 27 wherein, in the first iteration, an entity of the Set B is part of the subset $S_{B1}$ if a ranking function returns an output above a threshold, wherein a typicality value or a coverage value, or both, of the entity are inputs to the ranking function;
and wherein the typicality value is computed by comparing:
one or more associations between the entity and the subset $S_{A1}$, with
one or more associations between the entity and the Set A;
and wherein the coverage value is computed by comparing:
one or more associations between the entity and the subset $S_{A1}$, with
all entities within the subset $S_{A1}$.

32. The non-transitory computer readable medium of claim 31 wherein, if there are multiple entities in the Set B, the typicality value and the coverage value of each one of the multiple entities are computed in parallel to determine which ones of the multiple entities are part of the subset $S_{B1}$.

33. The non-transitory computer readable medium of claim 27 wherein, in a second iteration of the iterative process, an entity of the Set A is part of a subset $S_{A2}$ if a ranking function returns an output above a threshold, wherein a typicality value or a coverage value, or both, of the entity are inputs to the ranking function;
and wherein the typicality value is computed by comparing:
one or more associations between the entity and the subset $S_{B1}$, with
one or more associations between the entity and the Set B;
and wherein the coverage value is computed by comparing:
one or more associations between the entity and the subset $S_B$, with
all entities within the subset $S_{B_i}$.

34. The non-transitory computer readable medium of claim 33 wherein, if there are multiple entities in the Set A, the typicality value and the coverage value of each one of the multiple entities are computed in parallel to determine which ones of the multiple entities are part of the subset $S_{A2}$.

35. The non-transitory computer readable medium of claim 27 wherein the Set A comprises one or more users and the Set B comprises one or more websites able to be visited by the one or more users.

36. The non-transitory computer readable medium of claim 27 wherein the Set A comprises one or more words and the Set B comprises one or more users which are able to use the one or more words.

37. The non-transitory computer readable medium of claim 27 wherein another computing device, in communication with the computing system, provides the initial set of data comprising the subset $S_{A1}$.

38. A non-transitory computer readable medium storing executable instructions for computing a group of entities, the executable instructions, that when executed by a computing system, cause the computing system to at least:
use a communication device to access a first set of entities and a second set of entities;
compute an iterative process comprising multiple iterations, and in a given one of the iterations the iterative process comprising:
obtaining a first set of entities, a subset of entities of the first set, and at least a first entity and a second entity of the second set of entities, wherein the first set of entities and the second set of entities are represented in a bipartite directed graph;
computing a process for the first entity in the second set, comprising: obtaining one or more associations between the first entity of the second set and the first set; obtaining one or more associations between the first entity of the second set and the subset of the first set; obtaining one or more associations between the subset of the first set and the second set; and computing a typicality value associated with the first entity of the second set by comparing:
the associations between the first entity of the second set and the subset of the first set with
the associations between the first entity of the second set and the first set; and,
the process for the first entity in the second set further comprising, after determining a ranking function returns an output above a threshold, establishing that the first entity is part of a subset of the second set, wherein the typicality value is an input to the ranking function;
computing a same process for the second entity of the second set as the first entity of the second set, wherein the computing device computes the same process in parallel and independently from computing the process for the first entity of the second set; and
wherein each iteration in the iterative process results in subsets of the first set and subsets of the second set, and the iterative process stops after detecting that the subsets of the first set converge, or the subsets of the second set converge, or both.

39. The non-transitory computer readable medium of claim 38 wherein the typicality value is computed by $$\delta(j, A_G) = \frac{|A_j \cap A_G|}{|A_j|},$$

wherein:
j represents the first entity of the second set;
$A_j$, represents a set of entities within the first set with which the first entity of the second set is associated; and
$A_G$ is the subset of the first set.

* * * * *